(12) United States Patent
Gupta et al.

(10) Patent No.: US 11,159,732 B2
(45) Date of Patent: Oct. 26, 2021

(54) METHOD, SYSTEM AND APPARATUS FOR CAPTURING AN IMAGE

(71) Applicant: CANON KABUSHIKI KAISHA, Tokyo (JP)

(72) Inventors: Amit Kumar Gupta, Carlingford (AU); David Kenji See, Artarmon (AU); Jeroen Vendrig, Liberty Grove (AU)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/791,495

(22) Filed: Feb. 14, 2020

(65) Prior Publication Data

US 2020/0267321 A1     Aug. 20, 2020

(30) Foreign Application Priority Data

Feb. 20, 2019   (AU) ................................ 2019201192

(51) Int. Cl.
*H04N 5/225*    (2006.01)
*H04N 5/232*    (2006.01)
*G06T 7/70*     (2017.01)
*G06T 7/20*     (2017.01)
*G06K 9/00*     (2006.01)

(52) U.S. Cl.
CPC ..... *H04N 5/23296* (2013.01); *G06K 9/00724* (2013.01); *G06T 7/20* (2013.01);
(Continued)

(58) Field of Classification Search
CPC .. H04N 5/23296; H04N 5/23299; G06T 7/70; G06T 7/20; G06T 2207/10016;
(Continued)

(56) References Cited

U.S. PATENT DOCUMENTS 5,111,288 A  *  5/1992  Blackshear ...... G08B 13/19619
                                              348/143
9,167,221 B2    10/2015  Grundmann et al.
(Continued)

FOREIGN PATENT DOCUMENTS

AU    2011253910 B2   6/2013
AU    2013205548 A1   11/2014
AU    2014216000 A1   3/2016

OTHER PUBLICATIONS

Carr, Peter, et al., Hybrid Robotic/Virtual Pan-Tilt-Zom Cameras for Autonomous Event Recording, In Proceedings of the 21st ACM International Conference on Multimedia, Oct. 21-25, 2013, 193-202, ACM.

*Primary Examiner* — Jayanti K Patel
*Assistant Examiner* — Richard B Carter
(74) *Attorney, Agent, or Firm* — Canon U.S.A., Inc, IP Division

(57) ABSTRACT

A method of capturing an image of a scene. A current location of a plurality of objects in a frame of a video capturing the scene having one or more events of interest, is determined. For at least one of the events of interest, a time and a location for each of the plurality of objects associated with the event of interest is predicted based on the current location of the plurality of objects. A frame subset score is determined for each of a plurality of frame subsets in the frame, each of the plurality of frame subsets including one or more of the plurality of objects based on the predicted time and the predicted location for the event of interest. One of the determined plurality of frame subsets is selected based on the determined frame subset score. An image of the event of interest is captured using a camera, based on a camera orientation setting for the selected frame subset, where the captured image comprises the selected frame subset.

13 Claims, 17 Drawing Sheets

(52) U.S. Cl.
CPC ........... *G06T 7/70* (2017.01); *H04N 5/23299* (2018.08); *G06K 2009/00738* (2013.01); *G06T 2207/10016* (2013.01); *G06T 2207/30196* (2013.01); *G06T 2207/30228* (2013.01)

(58) Field of Classification Search
CPC ........... G06T 2207/30196; G06T 2207/30228; G06K 9/00724; G06K 2009/00738
USPC .................. 1/1; 348/142, 169, 143; 382/115
See application file for complete search history.

(56) References Cited

U.S. PATENT DOCUMENTS

| | | |
|---|---|---|
| 9,216,319 B2 | 12/2015 | Deangelis et al. |
| 9,237,330 B2 * | 1/2016 | Wang ................... H04N 13/271 |
| 9,357,203 B2 | 5/2016 | Ohba et al. |
| 9,684,830 B2 | 6/2017 | Kim et al. |
| 9,742,992 B2 | 8/2017 | Liu et al. |
| 9,846,810 B2 | 12/2017 | Partis |
| 9,849,334 B2 | 12/2017 | Deangelis et al. |
| 10,003,722 B2 | 6/2018 | Carr et al. |
| 2012/0062732 A1 * | 3/2012 | Marman .......... G08B 13/19682 348/142 |
| 2013/0148852 A1 | 6/2013 | Partis et al. |
| 2013/0266193 A1 * | 10/2013 | Tiwari ................ G06F 16/5854 382/115 |
| 2016/0314596 A1 | 10/2016 | Yu |
| 2018/0167553 A1 | 6/2018 | Yee et al. |
| 2018/0349704 A1 | 12/2018 | Mehrseresht et al. |
| 2019/0013047 A1 * | 1/2019 | Wait ................... G06K 9/00751 |

* cited by examiner

METHOD, SYSTEM AND APPARATUS FOR CAPTURING AN IMAGE

REFERENCE TO RELATED PATENT APPLICATION

This application claims the benefit under 35 U.S.C. § 119 of the filing date of Australian Patent Application No. 2019201192, filed Feb. 20, 2019, hereby incorporated by reference in its entirety as if fully set forth herein.

TECHNICAL FIELD

The present invention relates to automated photography of events and, in particular, to orientation and zoom of an adjustable zoom camera, to capture an image of an event including one or more objects. The present invention also relates to a computer program product including a computer readable medium having recorded thereon a computer program for orientating and zooming an adjustable zoom camera to capture an image of an event including one or more objects.

BACKGROUND

It is desirable to take good quality photographs of events. Examples of events include important moments at sporting fixtures such as goals scored in football, or crossing a finishing line in an athletic running race. Multiple objects may be present at each such event. For example, there are many football players on a field when a goal is scored, and there are several athletes in an athletic running race when the winning athlete crosses the finishing line.

To capture a good quality image of an event, it is necessary to choose a framing of the image. One aspect of framing is the field of view. In general, a narrow field of view is desirable, because a narrow field of view renders objects in the scene with greatest size and resolution. A technique such as digital zoom may be used to simulate a narrow field of view from a wide field of view. However, the digital zoom technique suffers from poor resolution and poor image quality.

An adjustable zoom camera may be used to capture images of an event. The zoom setting, and thus field of view, on such a camera may be adjusted to maximize the quality of the image. In general, the zoom setting is adjusted to give the narrowest field of view while still being able to include desired objects in the image.

Another aspect of framing is selection of the subset of objects to be included in the image. The desirability of including a given object in the image depends on factors such as the role of the object in the event, and proximity of the objects to other objects. For example, at a football match when a goal is scored, the goalkeeper has a role that means it is desirable to include the goalkeeper when framing an image of the match. Similarly, an attacking player who made a shot at goal has a role that means it is desirable to include the player in the framing of the image. In another example, in an athletic running race, a winning athlete has a role that means it is desirable to include the athlete in the framing of the image. Similarly, any other athlete who is close to being the winning athlete has a role that means it is desirable to include that athlete in the framing of the image. In this way, the choice of framing subset may determine the framing of an image.

A professional photographer may change the orientation of an adjustable zoom camera, once the photographer has decided upon a framing of a photograph of an event. The photographer may also adjust the zoom setting of the camera in order to include desirable objects and exclude undesirable objects. The photographer may also adjust the zoom setting of the camera using the narrowest field of view possible, in order to maximize size and resolution of the objects in an image.

It is desirable to use an automated system that may replace some or all aspects of the professional photographer, in order to capture high quality images of events. Such an automated system may make use of: computer-based object detection and tracking algorithms, in order to determine the location of objects; an adjustable zoom camera; and a motorized pan/tilt base, in order to change the orientation of the camera. Such an automated system may determine the framing of a photograph based on static analysis of the scene. For example, such a system may determine to capture an image of the winning athlete of an athletic running race at a pre-determined time after the start of the race. In such a case, the framing includes all lanes at the finishing line, since the winning athlete is not known at the time the framing is determined.

Alternatively, an automated system may determine the framing of an image based on dynamic analysis of the scene. For example, such a system may determine to capture an image of an athlete when that athlete is the first athlete to cross the finishing line of an athletic running race. However, such an automated system is reactionary, in the sense that the framing of the image is in reaction to the current situation and, in particular, in reaction to the current location of the objects.

Conventional automated image capture systems perform poorly for rapidly changing scenes, where the objects are moving quickly. For example, due to the latency of changing the orientation and zoom setting of a camera, an attempt to capture an image of the winning athlete of an athletic running race results in an image that does not capture the moment of the winning athlete crossing the finishing line, but rather, results in an image captured some time after the winning athlete has crossed the finishing line.

SUMMARY

It is an object of the present invention to substantially overcome, or at least ameliorate, one or more disadvantages of existing arrangements.

Disclosed are arrangements which seek to detect and track multiple moving objects (e.g., players, athletes) where one or more events may take place (e.g., shots at goal, finishing race, etc). In one or more of the disclosed arrangements, a pan/tilt base, and a zoom-adjustable camera may be used as part of an automated system to capture images of the events. Based on observation of the objects, one or more of the disclosed arrangements may be used to predict that one or more events may happen in the future. For each such an event, the disclosed arrangements may be used predict where the objects will be in an image.

For each possible future event, in one or more of the disclosed arrangements, one or more possible subsets of the objects to include in an image may be determined. Each subset corresponds to a framing of the image. Each framing may be based on the predicted locations of the subset of objects when that event is predicted to occur. For each frame subset, a score which represents a prediction of the quality of the corresponding image may be determined. The frame subset with the highest score may be selected, and a pan/tilt base and a zoom-adjustable camera may be used to capture the image of the event.

According to one aspect of the present disclosure, there is provided a method of capturing an image of a scene, the method comprising:
  determining a current location of a plurality of objects in a frame of a video capturing the scene having one or more events of interest;
  predicting, for at least one of the events of interest, a time and a location for each of the plurality of objects associated with the event of interest based on the current location of the plurality of objects;
  determining a frame subset score for each of a plurality of frame subsets in the frame, each of the plurality of frame subsets including one or more of the plurality of objects based on the predicted time and the predicted location for the event of interest;
  selecting one of the determined plurality of frame subsets based on the determined frame subset score; and
  capturing an image of the event of interest using a camera, based on a camera orientation setting for the selected frame subset, wherein the captured image comprises the selected frame subset.

According to another aspect of the present disclosure, there is provided an apparatus for capturing an image of a scene, the apparatus comprising:
  means for determining a current location of a plurality of objects in a frame of a video capturing the scene having one or more events of interest;
  means for predicting, for at least one of the events of interest, a time and a location for each of the plurality of objects associated with the event of interest based on the current location of the plurality of objects;
  means for determining a frame subset score for each of a plurality of frame subsets in the frame, each of the plurality of frame subsets including one or more of the plurality of objects based on the predicted time and the predicted location for the event of interest;
  means for selecting one of the determined plurality of frame subsets based on the determined frame subset score; and
  means for capturing an image of the event of interest using a camera, based on a camera orientation setting for the selected frame subset, wherein the captured image comprises the selected frame subset.

According to still another aspect of the present disclosure, there is provided a system for capturing an image of a scene, the system comprising:
  a memory for storing data and a computer program;
  a processor coupled to the memory for executing the computer program, the program comprising instructions for:
  determining a current location of a plurality of objects in a frame of a video capturing a scene having one or more events of interest;
  predicting, for at least one of the events of interest, a time and a location for each of the plurality of objects associated with the event of interest based on the current location of the plurality of objects;
  determining a frame subset score for each of a plurality of frame subsets in the frame, each of the plurality of frame subsets including one or more of the plurality of objects based on the predicted time and the predicted location for the event of interest;
  selecting one of the determined plurality of frame subsets based on the determined frame subset score; and
  capturing an image of the event of interest using a camera, based on a camera orientation setting for the selected frame subset, wherein the captured image comprises the selected frame subset.

According to still another aspect of the present disclosure, there is provided a non-transitory computer readable medium having a computer program stored on the medium for capturing an image of a scene, the program comprising:
  code for determining a current location of a plurality of objects in a frame of a video capturing a scene having one or more events of interest;
  code for predicting, for at least one of the events of interest, a time and a location for each of the plurality of objects associated with the event of interest based on the current location of the plurality of objects;
  code for determining a frame subset score for each of a plurality of frame subsets in the frame, each of the plurality of frame subsets including one or more of the plurality of objects based on the predicted time and the predicted location for the event of interest;
  code for selecting one of the determined plurality of frame subsets based on the determined frame subset score; and
  code for capturing an image of the event of interest using a camera, based on a camera orientation setting for the selected frame subset, wherein the captured image comprises the selected frame subset.

Other aspects are also disclosed.

BRIEF DESCRIPTION OF THE DRAWINGS

One or more embodiments of the invention will now be described with reference to the following drawings, in which.

DETAILED DESCRIPTION INCLUDING BEST MODE

Figure 1A:
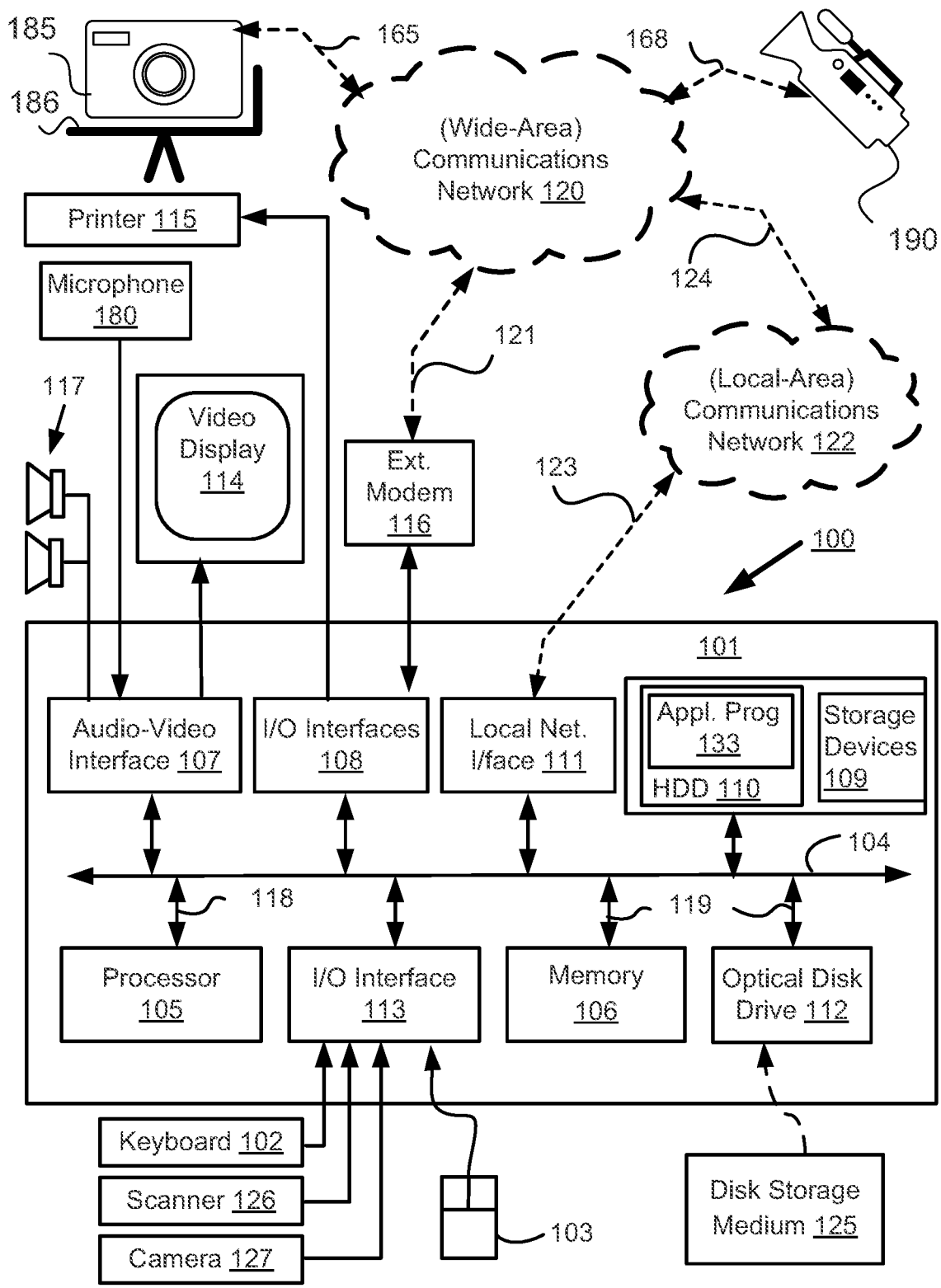
FIGS. 1A and 1B form a schematic block diagram showing a system for capturing an image, upon which described arrangements may be practiced.

Where reference is made in any one or more of the accompanying drawings to steps and/or features, which have the same reference numerals, those steps and/or features have for the purposes of this description the same function(s) or operation(s), unless the contrary intention appears.

FIG. 1A is a diagram showing a computer system 100 for capturing an image. The system 100 comprises an adjustable zoom camera 185 placed upon a motorized pan/tilt base 186, and is used to capture a high-quality image of an event. A wide-angle camera 190 is also placed on a fixed base, and may be used to determine the location of objects. The objects may be people (e.g., athletes, players) associated with an event. The adjustable zoom camera 185 and the wide-angle camera 190 are connected to a communications network 120, via connections 165 and 168, respectively. A computer module 101 is also connected to the network via a connection 121.

Figure 4:
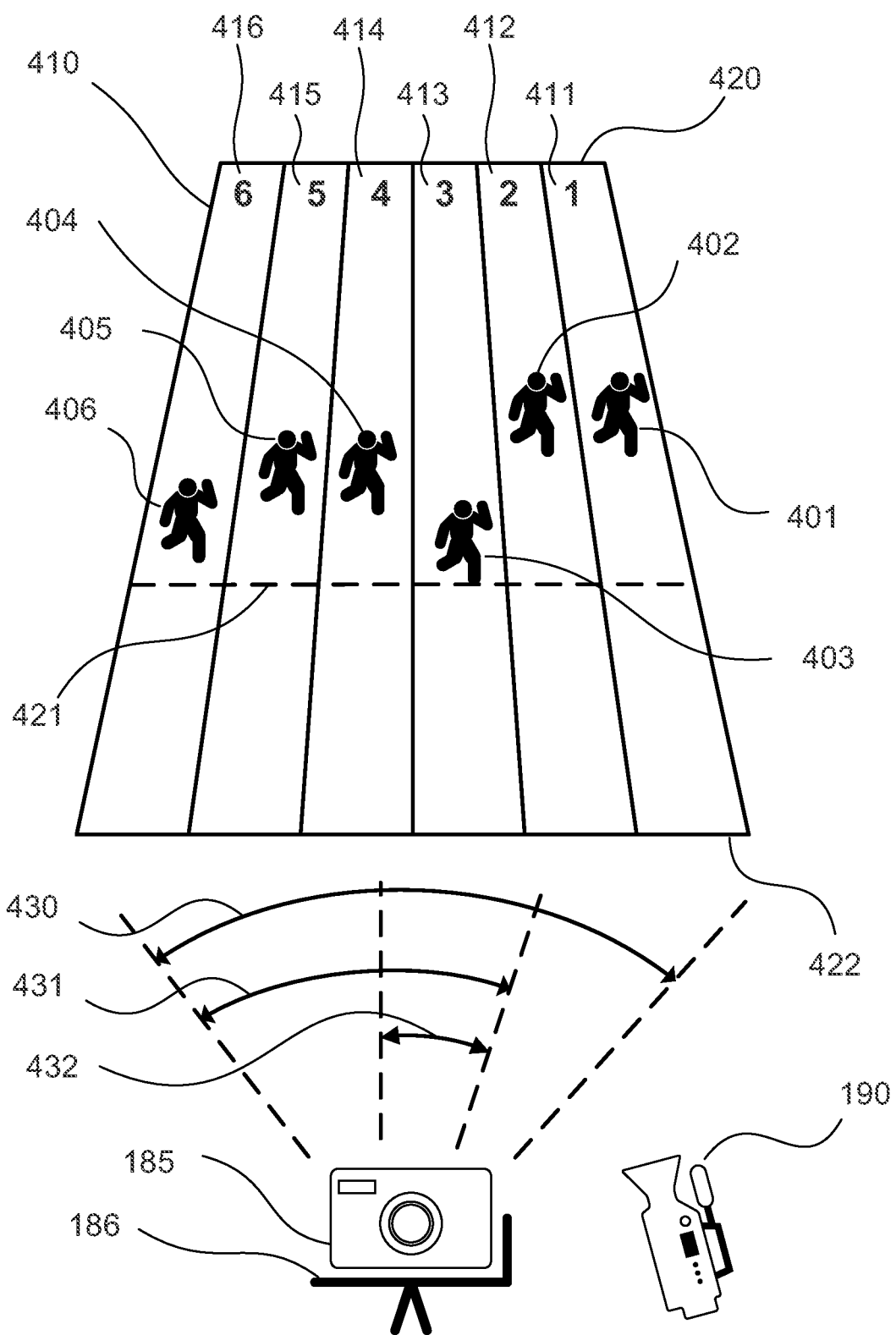
FIG. 4 shows an example of an athletic running race where the method of FIG. 2 may be used.

The system 100 will be described by way of example where, as seen in FIG. 4, the fixture is an athletic track 410 is divided into six lanes, numbered one (1) to six (6). Each lane has a single athlete. As seen in FIG. 4, an athlete 401 is in lane one (1) 411; an athlete 402 is in lane two (2) 412; an athlete 403 is in lane three (3) 413; an athlete 404 is in lane four (4) 414; an athlete 405 is in lane five (5) 415; and an athlete 406 is in lane six (6) 416. The athletes start a race at starting line 420, and finish the race at finishing line 422. In the example of FIG. 4, the event to be photographed is a winning athlete crossing the finishing line 422.

As seen in FIG. 1A, input devices such as a keyboard 102, a mouse pointer device 103, a scanner 126, and a microphone 180; and output devices including a printer 115, a display device 114 and loudspeakers 117, are connected to the computer module 101. An external Modulator-Demodulator (Modem) transceiver device 116 may be used by the computer module 101 for communicating to and from the communications network 120 via the connection 121. The communications network 120 may be a wide-area network (WAN), such as the Internet, a cellular telecommunications network, or a private WAN. Where the connection 121 is a telephone line, the modem 116 may be a traditional "dial-up" modem. Alternatively, where the connection 121 is a high capacity (e.g., cable) connection, the modem 116 may be a broadband modem. A wireless modem may also be used for wireless connection to the communications network 120.

The computer module 101 typically includes at least one processor unit 105, and a memory unit 106. For example, the memory unit 106 may have semiconductor random access memory (RAM) and semiconductor read only memory (ROM). The computer module 101 also includes a number of input/output (I/O) interfaces including: an audio-video interface 107 that couples to the video display 114, loudspeakers 117 and microphone 180; an I/O interface 113 that couples to the keyboard 102, mouse 103, scanner 126, camera 127 and optionally a joystick or other human interface device (not illustrated); and an interface 108 for the external modem 116 and printer 115. In some implementations, the modem 116 may be incorporated within the computer module 101, for example within the interface 108. The computer module 101 also has a local network interface 111, which permits coupling of the computer module 101 via a connection 123 to a local-area communications network 122, known as a Local Area Network (LAN). As illustrated in FIG. 1A, the local communications network 122 may also couple to the wide network 120 via a connection 124, which would typically include a so-called "firewall" device or device of similar functionality. The local network interface 111 may comprise an Ethernet circuit card, a Bluetooth® wireless arrangement or an IEEE 802.11 wireless arrangement; however, numerous other types of interfaces may be practiced for the interface 111.

The I/O interfaces 108 and 113 may afford either or both of serial and parallel connectivity, the former typically being implemented according to the Universal Serial Bus (USB) standards and having corresponding USB connectors (not illustrated). Storage devices 109 are provided and typically include a hard disk drive (HDD) 110. Other storage devices such as a floppy disk drive and a magnetic tape drive (not illustrated) may also be used. An optical disk drive 112 is typically provided to act as a non-volatile source of data. Portable memory devices, such optical disks (e.g., CD-ROM, DVD, Blu ray Disc™), USB-RAM, portable, external hard drives, and floppy disks, for example, may be used as appropriate sources of data to the module 101.

The components 105 to 113 of the computer module 101 typically communicate via an interconnected bus 104 and in a manner that results in a conventional mode of operation of the computer module 101 known to those in the relevant art. For example, the processor 105 is coupled to the system bus 104 using a connection 118. Likewise, the memory 106 and optical disk drive 112 are coupled to the system bus 104 by connections 119. Examples of computers on which the described arrangements can be practised include IBM-PC's and compatibles, Sun Sparcstations, Apple Mac™ or a like computer systems.

Methods described below may be implemented using the computer system 100 wherein the processes of FIG. 2, to be described, may be implemented as one or more software application programs 133 executable within the computer system 100. In particular, the steps of method 200 (see FIG. 2) are effected by instructions 131 (see FIG. 1B) in the software 133 that are carried out within the computer system 100. The software instructions 131 may be formed as one or more code modules, each for performing one or more particular tasks. The software may also be divided into two separate parts, in which a first part and the corresponding code modules performs the method 200 and a second part and the corresponding code modules manage a user interface between the first part and the user.

The software may be stored in a computer readable medium, including the storage devices described below, for example. The software 133 is typically stored in the HDD 110 or the memory 106. The software is loaded into the computer system 100 from the computer readable medium, and then executed by the computer system 100. Thus, for example, the software 133 may be stored on an optically readable disk storage medium (e.g., CD-ROM) 125 that is read by the optical disk drive 112. A computer readable medium having such software or computer program recorded on the computer readable medium is a computer program product. The use of the computer program product in the computer system 100 preferably effects an advantageous apparatus for implementing the described methods including the method 200.

In some instances, the application programs 133 may be supplied to the user encoded on one or more CD-ROMs 125 and read via the corresponding drive 112, or alternatively may be read by the user from the networks 120 or 122. Still further, the software can also be loaded into the computer system 100 from other computer readable media. Computer readable storage media refers to any non-transitory tangible storage medium that provides recorded instructions and/or data to the computer system 100 for execution and/or processing. Examples of such storage media include floppy disks, magnetic tape, CD-ROM, DVD, Blu-ray™ Disc, a hard disk drive, a ROM or integrated circuit, USB memory, a magneto-optical disk, or a computer readable card such as a PCMCIA card and the like, whether or not such devices are internal or external of the computer module 101. Examples of transitory or non-tangible computer readable transmission media that may also participate in the provision of software, application programs, instructions and/or data to the computer module 101 include radio or infra-red transmission channels as well as a network connection to another computer or networked device, and the Internet or Intranets including e-mail transmissions and information recorded on Websites and the like.

The second part of the application programs 133 and the corresponding code modules mentioned above may be executed to implement one or more graphical user interfaces (GUIs) to be rendered or otherwise represented upon the display 114. Through manipulation of typically the keyboard 102 and the mouse 103, a user of the computer system 100 and the application may manipulate the interface in a functionally adaptable manner to provide controlling commands and/or input to the applications associated with the GUI(s). Other forms of functionally adaptable user interfaces may also be implemented, such as an audio interface utilizing speech prompts output via the loudspeakers 117 and user voice commands input via the microphone 180.

Figure 1B:
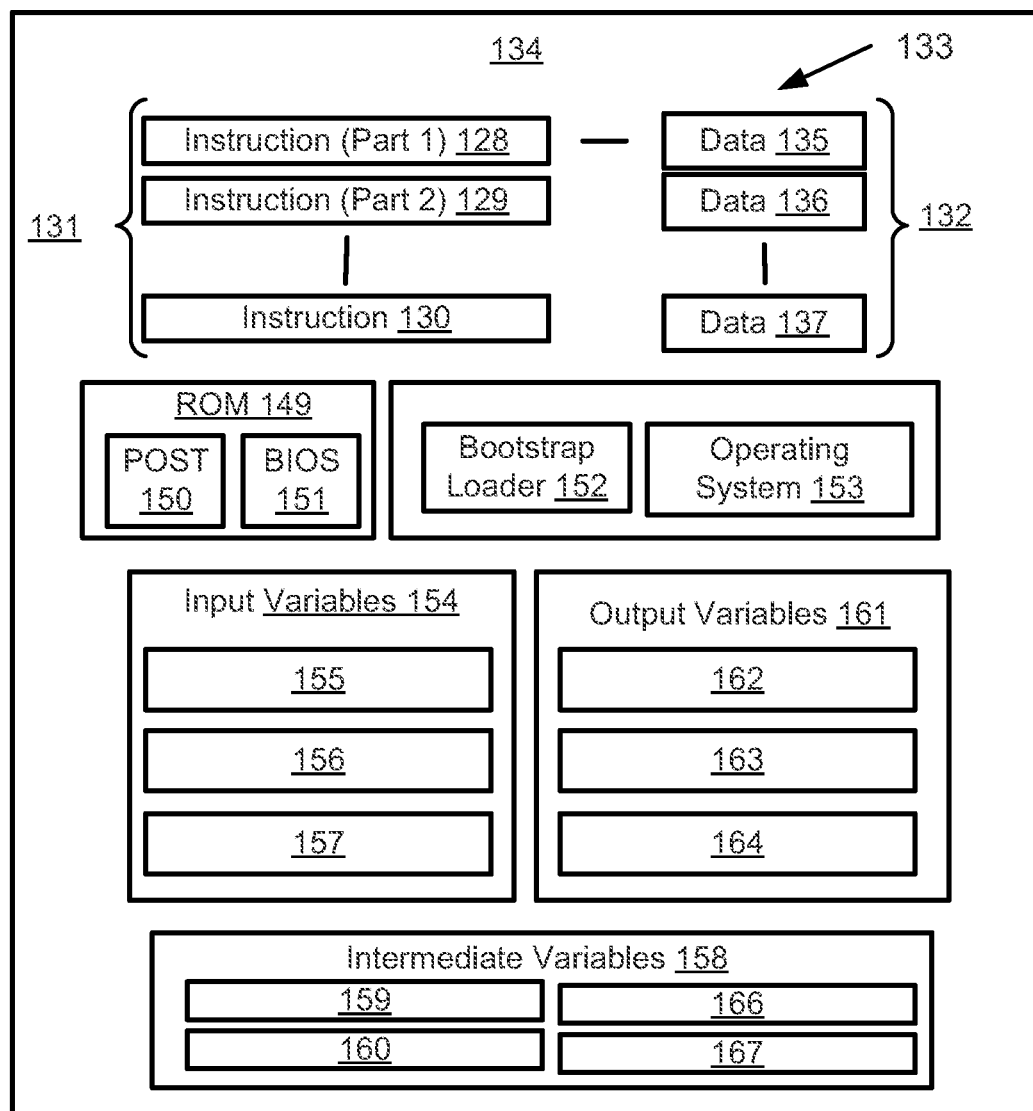
Figure 1B:
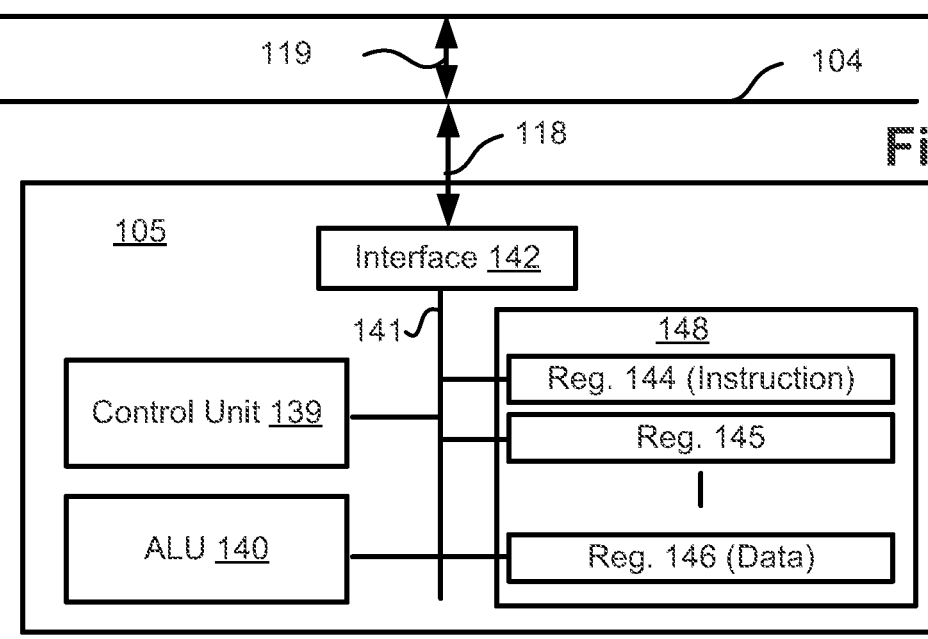

FIG. 1B is a detailed schematic block diagram of the processor 105 and a "memory" 134. The memory 134 represents a logical aggregation of all the memory modules (including the HDD 109 and semiconductor memory 106) that can be accessed by the computer module 101 in FIG. 1A.

When the computer module 101 is initially powered up, a power-on self-test (POST) program 150 executes. The POST program 150 is typically stored in a ROM 149 of the semiconductor memory 106 of FIG. 1B. A hardware device such as the ROM 149 storing software is sometimes referred to as firmware. The POST program 150 examines hardware within the computer module 101 to ensure proper functioning and typically checks the processor 105, the memory 134 (109, 106), and a basic input-output systems software (BIOS) module 151, also typically stored in the ROM 149, for correct operation. Once the POST program 150 has run successfully, the BIOS 151 activates the hard disk drive 110 of FIG. 1A. Activation of the hard disk drive 110 causes a bootstrap loader program 152 that is resident on the hard disk drive 110 to execute via the processor 105. This loads an operating system 153 into the RAM memory 106, upon which the operating system 153 commences operation. The operating system 153 is a system level application, executable by the processor 105, to fulfil various high-level functions, including processor management, memory management, device management, storage management, software application interface, and generic user interface.

The operating system 153 manages the memory 134 (109, 106) to ensure that each process or application running on the computer module 101 has sufficient memory in which to execute without colliding with memory allocated to another process. Furthermore, the different types of memory available in the system 100 of FIG. 1A need to be used properly so that each process can run effectively. Accordingly, the aggregated memory 134 is not intended to illustrate how particular segments of memory are allocated (unless otherwise stated), but rather to provide a general view of the memory accessible by the computer system 100 and how such is used.

As shown in FIG. 1B, the processor 105 includes a number of functional modules including a control unit 139, an arithmetic logic unit (ALU) 140, and a local or internal memory 148, sometimes called a cache memory. The cache memory 148 typically include a number of storage registers 144 - 146 in a register section. One or more internal busses 141 functionally interconnect these functional modules. The processor 105 typically also has one or more interfaces 142 for communicating with external devices via the system bus 104, using a connection 118. The memory 134 is coupled to the bus 104 using a connection 119.

The application program 133 includes a sequence of instructions 131 that may include conditional branch and loop instructions. The program 133 may also include data 132 which is used in execution of the program 133. The instructions 131 and the data 132 are stored in memory locations 128, 129, 130 and 135, 136, 137, respectively. Depending upon the relative size of the instructions 131 and the memory locations 128-130, a particular instruction may be stored in a single memory location as depicted by the instruction shown in the memory location 130. Alternately, an instruction may be segmented into a number of parts each of which is stored in a separate memory location, as depicted by the instruction segments shown in the memory locations 128 and 129.

In general, the processor 105 is given a set of instructions which are executed therein. The processor 1105 waits for a subsequent input, to which the processor 105 reacts to by executing another set of instructions. Each input may be provided from one or more of a number of sources, including data generated by one or more of the input devices 102, 103, data received from an external source across one of the networks 120, 102, data retrieved from one of the storage devices 106, 109 or data retrieved from a storage medium 125 inserted into the corresponding reader 112, all depicted in FIG. 1A. The execution of a set of the instructions may in some cases result in output of data. Execution may also involve storing data or variables to the memory 134.

The disclosed arrangements use input variables 154, which are stored in the memory 134 in corresponding memory locations 155, 156, 157. The disclosed arrangements produce output variables 161, which are stored in the memory 134 in corresponding memory locations 162, 163, 164. Intermediate variables 158 may be stored in memory locations 159, 160, 166 and 167.

Referring to the processor 105 of FIG. 1B, the registers 144, 145, 146, the arithmetic logic unit (ALU) 140, and the control unit 139 work together to perform sequences of micro-operations needed to perform "fetch, decode, and execute" cycles for every instruction in the instruction set making up the program 133. Each fetch, decode, and execute cycle comprises:

a fetch operation, which fetches or reads an instruction 131 from a memory location 128, 129, 130;

a decode operation in which the control unit 139 determines which instruction has been fetched; and an execute operation in which the control unit 139 and/or the ALU 140 execute the instruction.

Thereafter, a further fetch, decode, and execute cycle for the next instruction may be executed. Similarly, a store cycle may be performed by which the control unit 139 stores or writes a value to a memory location 132.

Figure 2:
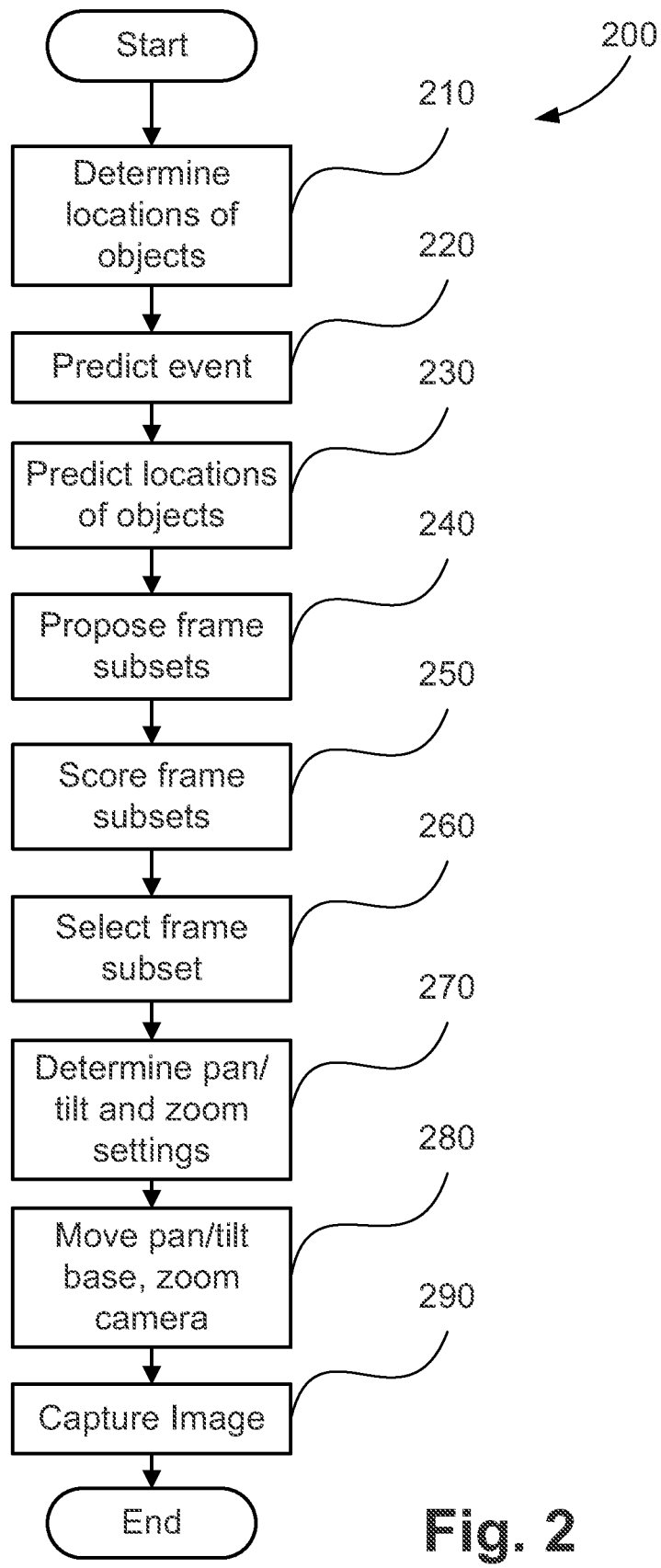
FIG. 2 is a schematic flow diagram showing a method of capturing an image of a scene.

Each step or sub-process in the processes of FIG. 2 is associated with one or more segments of the program 133 and is performed by the register section 144, 145, 147, the ALU 140, and the control unit 139 in the processor 105 working together to perform the fetch, decode, and execute cycles for every instruction in the instruction set for the noted segments of the program 133.

The described methods including the method 200 may alternatively be implemented in dedicated hardware such as one or more integrated circuits performing the functions or sub functions of the method 200. Such dedicated hardware may include graphic processors, digital signal processors, or one or more microprocessors and associated memories.

FIG. 2 is a schematic flow diagram showing a method 200 of capturing an image of a scene. The method 200 will be described by way of example where one or more events of interest (e.g., an athlete crossing the finishing line in an athletic running race, a player having a shot at goal at a football game) is occuring in the scene. The method 200 may be used in determining a framing for the image.

The method 200 may be implemented as one or more software code modules of the software application program 133 resident on the hard disk drive 110 and being controlled in its execution by the processor 105.

The method 200 begins at determining step 210. A series of video frames may be captured by the camera 190 at step 210. The captured video frames may be uploaded to computer module 101 via the connection 168 and the communications network 120. Locations of objects in the scene are determined based on an analysis of at least one of the captured video frames, under execution of the processor 105. The locations of objects may be determined at step 210 using any suitable object detection and tracking algorithm. A current location of a plurality of the objects in one of the frames of the video, having one or more events of interest, may be determined at step 210.

The method 200 continues at predicting step 220, where one or events of interest are predicted to occur in the future. For example, where an athletic running race is occurring, the event may be a winning athlete crossing the finishing line. As another example, where a football game is occurring, the event may be a shot at goal by a player. For at least one of the events of interest, a time for each of the plurality of objects associated with the event of interest is determined at step 220 based on the current location of the plurality of objects.

The method 200 continues at predicting step 230, where locations of the objects are predicted, based on the time of the events that were predicted in step 220. For at least one of the events of interest, a location for each of the plurality of objects associated with the event of interest is determined at step 220 based on the current location of the plurality of objects determined at step 210.

The method 200 continues at determining step 240, where one or more frame subsets for the objects are proposed, under execution of the processor 105. Each frame subset corresponds to a framing of the image to be captured. Each of the frame subsets may include one or more of the plurality of objects based on the predicted time and the predicted location for an event of interest.

The method 200 continues at scoring step 250, where each frame subset is assigned a content value in the form of a score. The score may be based on the predicted quality of the corresponding image. The score determined at step 250 is based on the objects that are predicted to be included or excluded from the field of view. A frame subset score may be determined for each of a plurality of frame subsets in a frame at step 250. The score may be associated with one or more persons within a corresponding frame subset. In one arrangement, the score for a frame subset may be based on size of persons within the corresponding frame subset. In another arrangement, the content value of a frame subset may be based on an interaction score between the objects within the frame subset. The determination of the score for each frame subset will be described in more detail below with reference to FIGS. 9A, 9B and 9C.

The score determined at step 250 may be determined as the summation of one or more subscore components. One possible subscore is a representation of narrowness of the field of view of the framing In general, a narrow field of view is desirable, because the objects are rendered larger in the framing, with corresponding greater detail and image resolution.

Another possible subscore is a representation of confidence that a given framing will adequately capture the event, given the uncertainty due to the fact that the event is predicted, and the locations of objects in the event are predicted. For example, in the case of an athletic running race, although one athlete is predicted to be the winning athlete, a close runner-up may surge and be the winning athlete instead. Thus, a framing that included only the leading athlete may have lower confidence that the resultant photograph will include the winning athlete, than a framing that included both the leading athlete and the close runner-up. A higher confidence determines a higher subscore.

Another possible subscore is the aesthetic quality of the image that corresponds to the frame subset. The aesthetic quality of the image may be assessed on one or more aspects. One aspect of aesthetic quality is the structural composition of the photograph. For example, in adversarial games such as football, it may be desirable to have players of opposing teams facing each other. Another aspect of aesthetic quality is the semantic contribution of the objects in the photograph. For example, in a game such as football, each player has a role related to the event. In terms of maximizing the aesthetic quality of the image, some players may be more important than others. For example, for an event that corresponds to a shot at goal in football, a goalkeeper's role is important. The role of the attacker player who made the shot at goal is also important. The roles of other players, either on the attacking or defending side, may be less important. A higher aesthetic quality determines a higher subscore. A subscore related to aesthetic quality may be determined using heuristics that utilize prior knowledge about the roles of players and photographic filming rules. Alternatively, a subscore related to aesthetic quality may be determined using machine learning, where a computer system may be first trained using many training examples and a back-propagation technique in a training phase, before being used in an inference phase to determine a subscore.

The method 200 continues at selecting step 260, where one of the determined frame subsets is selected based on the frame subset score determined at step 250 for the selected frame subset.

The method 200 continues at determining step 270, where at least one orientation setting is determined for the camera 185, under execution of the processor 105. The orientation setting determined at step 270 may include pan/tilt settings for the motorized pan/tilt base 186. The pan/tilt settings may be determined from the framing corresponding to the frame subset selected in step 260. A zoom setting for the adjustable zoom camera 185 is also determined from the framing corresponding to the frame subset selected in step 260. The orientation setting determined at step 270 may comprise a value for each of pan, tilt and zoom.

The method 200 continues at moving step 280, where the motorized pan/tilt base 186 is moved to the setting determined in step 270, and simultaneously the adjustable zoom camera 185 is adjusted to the zoom setting determined in step 270. The processor 105 may send a signal to the base 186 in order move the motorized pan/tilt base 186 to the setting determined in step 270. The processor 105 may send a signal to the camera 185, via the connection 165, in order to adjust the zoom setting of the camera 185.

The method 200 continues at capturing step 290, where the adjustable zoom camera 185 is operated to capture one or more images of the event of interest occurring in the scene. Upon receiving a signal from the computer module 101, the camera 185 captures the images of the event of interest based on the camera orientation settings for the frame subset selected at step 260. The captured images comprise the frame subset selected at step 260.

Figure 3:
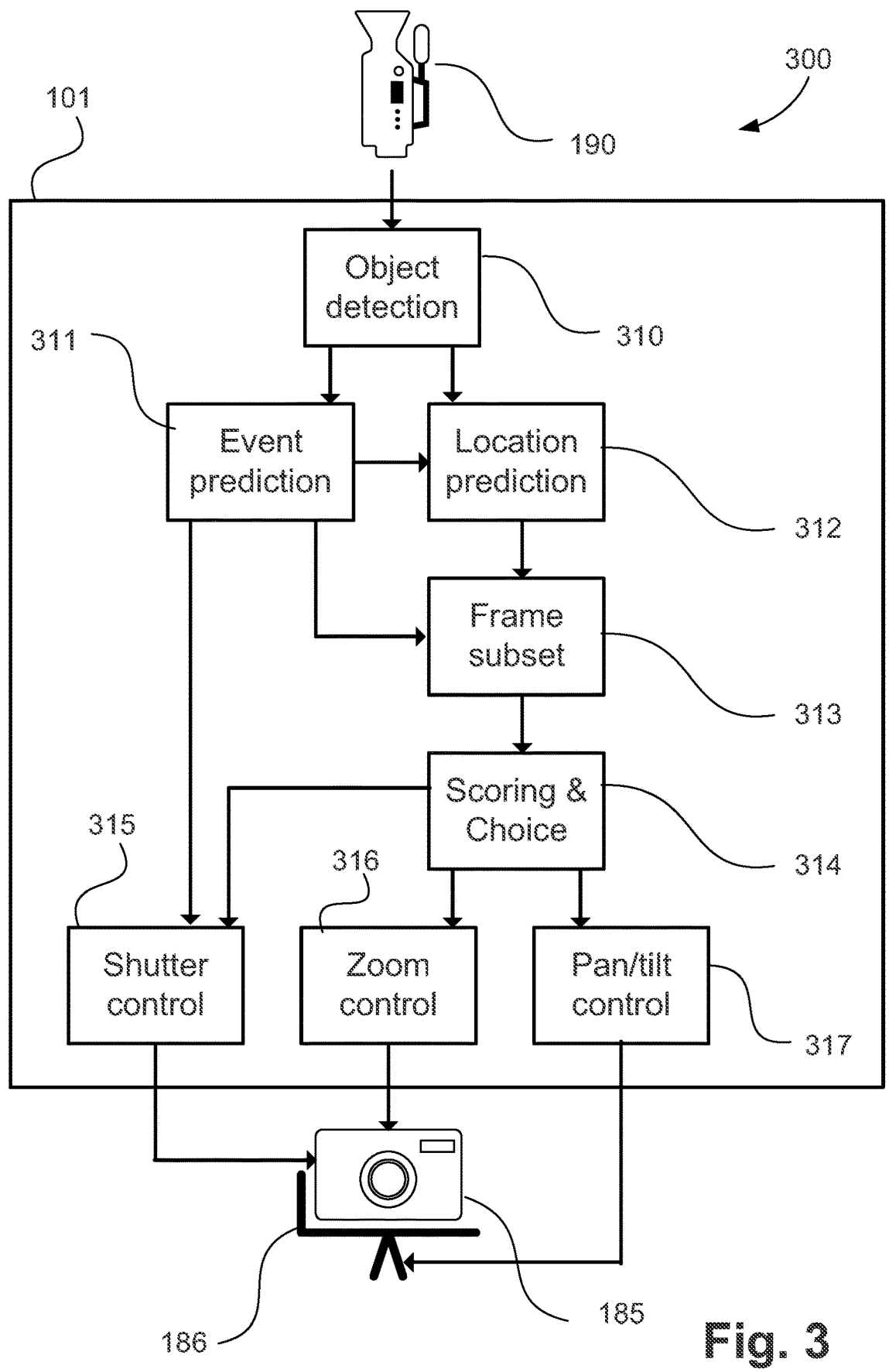
FIG. 3 is a schematic block diagram of a data processing architecture according to one arrangement.

FIG. 3 is a schematic block diagram of a data processing architecture 300 for implementing the method 200, in one arrangement.

The wide-angle camera 190 on a fixed base is placed so as to capture images that include all objects that may contribute to the image of the scene comprising an event. The wide-angle camera 190 is connected to the computer module 101 via the communications network and connection 168. The adjustable zoom camera 185 on the motorized pan/tilt base 186 is connected to the computer module 101.

As seen in FIG. 3, an object detection module 310 receives images from the wide-angle camera 190, and detects the location of one or more objects. An event prediction module 311 receives the location information of one or more objects from the object detection module 310, and predicts that one or more events will occur in the future. For each predicted event, the event prediction module 311 predicts when the event will occur.

A location prediction module 312 receives the predicted events from the event prediction module 311, and using the predictions of when the events will occur, and also using the location information from the object detection module 310, the module 312 predicts the future locations of objects for each of the predicted events.

A frame subset module 313 proposes one or more frame subsets of the events. Each frame subset corresponds to a subset of the objects. For a given frame subset, the predicted locations of the objects in the frame subset are determined by the location prediction module 312, according the predictions of when the events will occur, as determined by the event prediction module 311.

A scoring module 314 determines a score for each frame subset of the events. The score may be determined by a combination of factors. Examples of factors include: type of event, field of view of the framing corresponding to the frame subset, predicted number of objects in the frame subset, confidence in the prediction of the event, confidence in the prediction of the location of the objects in the frame subset, and aesthetic composition of the framing corresponding to the frame subset. Each factor may be determined as a subscore, where the subscores are combined in order to determine a score. The scoring module 314 additionally determines the frame subset with the highest score.

A zoom control module 316 determines the zoom setting corresponding to the field of view of the framing corresponding to the frame subset with the highest score, and controls the zoom setting of the camera 185 accordingly.

A pan/tilt control module 317 determines the pan/tilt settings corresponding to the field of view of the framing corresponding to the frame subset with the highest score, and controls the motorized pan/tilt base 186 accordingly.

A shutter control module 315 determines the optimal time to capture one or more images, based on the prediction of the event, and the framing corresponding to the frame subset with the highest score, and controls the shutter of the camera 185 accordingly.

The modules 310-317 may be implemented as one of more software code modules of the software application program 133 resident in the hard disk drive 110 and being controlled in their execution by processor 105.

The method 200 will now be described further by way of example.

As described above, FIG. 4 shows an example of an athletic running race where the method 200 may be used. The wide-angle camera 190 is placed on a fixed base, and is used to determine the location of objects (e.g., athletes in the athletic running race of FIG. 4). The athletic track 410 is divided into six lanes, numbered one (1) to six (6). Each lane has a single athlete. The athlete 401 is in lane one (1) 411. The athlete 402 is in lane two (2) 412. The athlete 403 is in lane three (3) 413. The athlete 404 is in lane four (4) 414. The athlete 405 is in lane five (5) 415. The athlete 406 is in lane six (6) 416.

The athletes start the race at starting line 420, and finish the race at finishing line 422. The event to be photographed is the winning athlete crossing the finishing line 422. When the leading athlete advances to be a pre-determined distance 421 from the finishing line 422, the pan/tilt base 186 is moved to set the orientation of the camera 185, as at step 270 and 280, and the zoom setting on the camera 185 is adjusted, in order to capture an image of the winning athlete crossing the finishing line 422.

One possible orientation and zoom setting of the camera 185 corresponds to a framing using a wide field of view 430 that includes all athletes. Another possible orientation and zoom setting of the camera 185 corresponds to a framing using a narrow field of view 432 that includes only one athlete. Another possible orientation and zoom setting of the camera 185 corresponds to a framing using an intermediate field of view 431 that includes a subset of the athletes.

Figure 5:
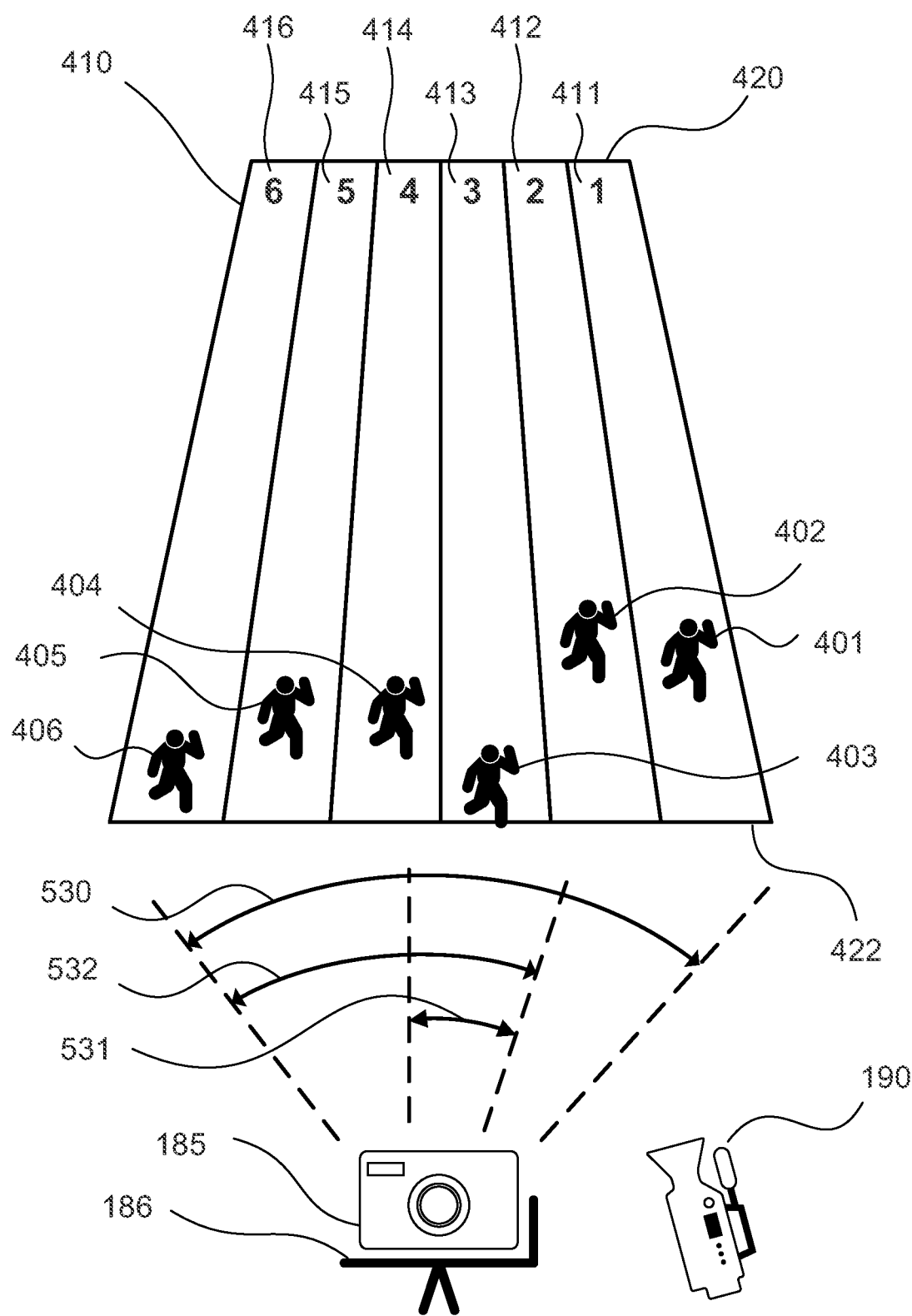
FIG. 5 is a diagram showing an example of prediction of an event in the running race of FIG. 4.

FIG. 5 shows an example of a prediction of an event in the running race of FIG. 4. In the example of FIG. 5, the adjustable zoom camera 185 is placed upon the motorized pan/tilt base 186, and is used to capture a high-quality image of an event. The wide-angle camera 190 is placed on a fixed base, and is used to determine the location of objects.

Again, in FIG. 5, the athletic track 410 is divided into six lanes, numbered 1 to 6, where each lane has a single athlete. The athlete 401 is in lane one (1) 411, and is predicted (as at step 230 of the method 200) to be in the position shown in FIG. 5. The athlete 402 is in lane two (2) 412, and is predicted (as at step 230 of the method 200) to be in the position shown in FIG. 5. Similarly, the athlete 403 is in lane three (3) 413, and is predicted to be in the position shown in FIG. 5; the athlete 404 is in lane four (4) 414, and is predicted to be in the position shown in FIG. 5; the athlete 405 is in lane five (5) 415, and is predicted to be in the position shown in FIG. 5; and the athlete 406 is in lane six (6) 416, and is predicted to be in the position shown in FIG. 5.

The athletes start the race at the starting line 420, and finish the race at the finishing line 422. The event to be photographed is the winning athlete crossing the finishing line 422. Thus, the predicted time of the event is determined by the time that the athlete 403 is predicted to cross the finishing line 422. The prediction of the time of the event is determined by the event prediction module 311 in FIG. 3, as at step 220 of the method 200 in FIG. 2.

At the predicted time of the event, the predicted location of the athletes 401-406 is shown in FIG. 5. The predictions of the locations of the athletes 401-406 is determined by the location prediction module 312 in FIG. 3, as at step 230 of the method 200 in FIG. 2. At the predicted time of the event, the predicted location of the athlete 403 is at the finishing line 422. At the predicted time of the event, the predicted location of the athlete 406 is near the finishing line 422. The athlete 406 is predicted to be a close runner-up to the athlete 403.

Multiple frame subsets of the athletes are possible. Frame subsets of the athletes are determined by the frame subset module 313 in FIG. 3, as at step 240 of the method 200 in FIG. 2. A possible frame subset of the athletes includes all athletes, which corresponds to the framing with a wide-angle field of view 530. Another possible frame subset only includes the athlete 403 that is predicted to be the winning athlete, which corresponds to the framing with a narrow angle field of view 531. Another possible frame subset includes the athlete 403, being the predicted winning athlete, and the athlete 406, being the predicted close runner-up, which corresponds to the framing with an intermediate field of view 532.

Figure 6:
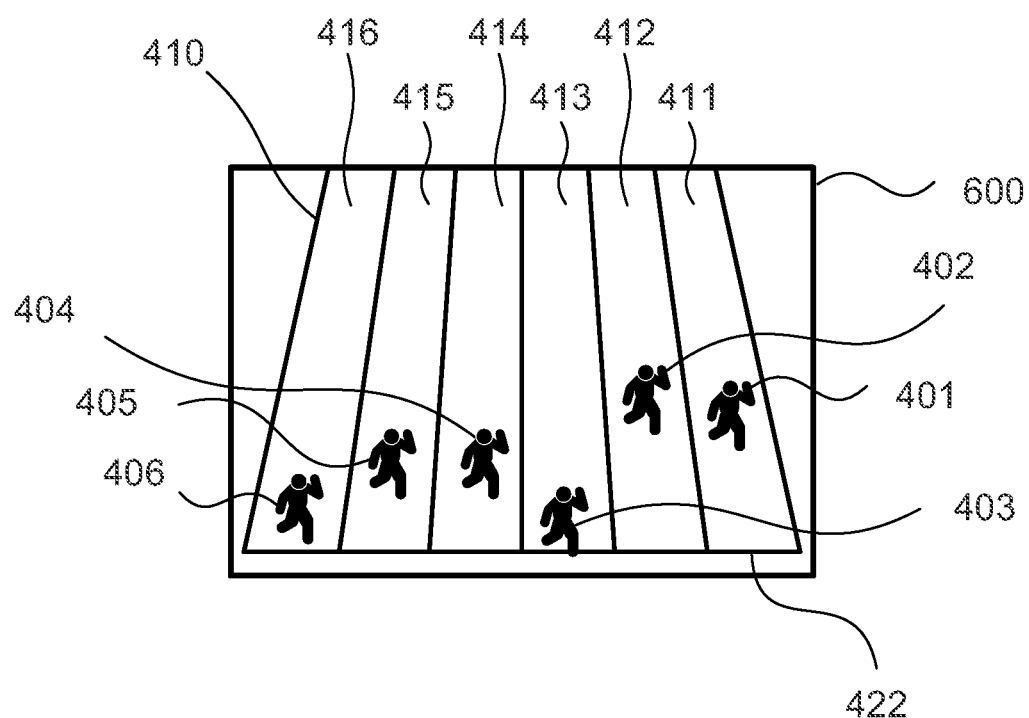
FIG. 6 is shows a framing corresponding to a frame subset in the example of FIG. 5.

FIG. 6 shows a framing 600 that corresponds to the wide-angle field of view 530 in FIG. 5. As described above, the athletic track 410 is divided into six lanes, numbered 1 to 6. Each lane has a single athlete. The athlete 401 is in lane one (1) 411, and is predicted (as at step 230 of the method 200) to be in the position shown in FIG. 6; the athlete 402 is in lane two (2) 412, and is predicted to be in the position shown in FIG. 6; the athlete 403 is in lane three (3) 413, and is predicted to be in the position shown in FIG. 6; the athlete 404 is in lane four (4) 614, and is predicted to be in the position shown in FIG. 6; the athlete 405 is in lane five (5) 615, and is predicted to be in the position shown in FIG. 6; and the athlete 406 is in lane six (6) 416, and is predicted to be in the position shown in FIG. 6. The athletes finish the race at the finishing line 422.

Figure 7:
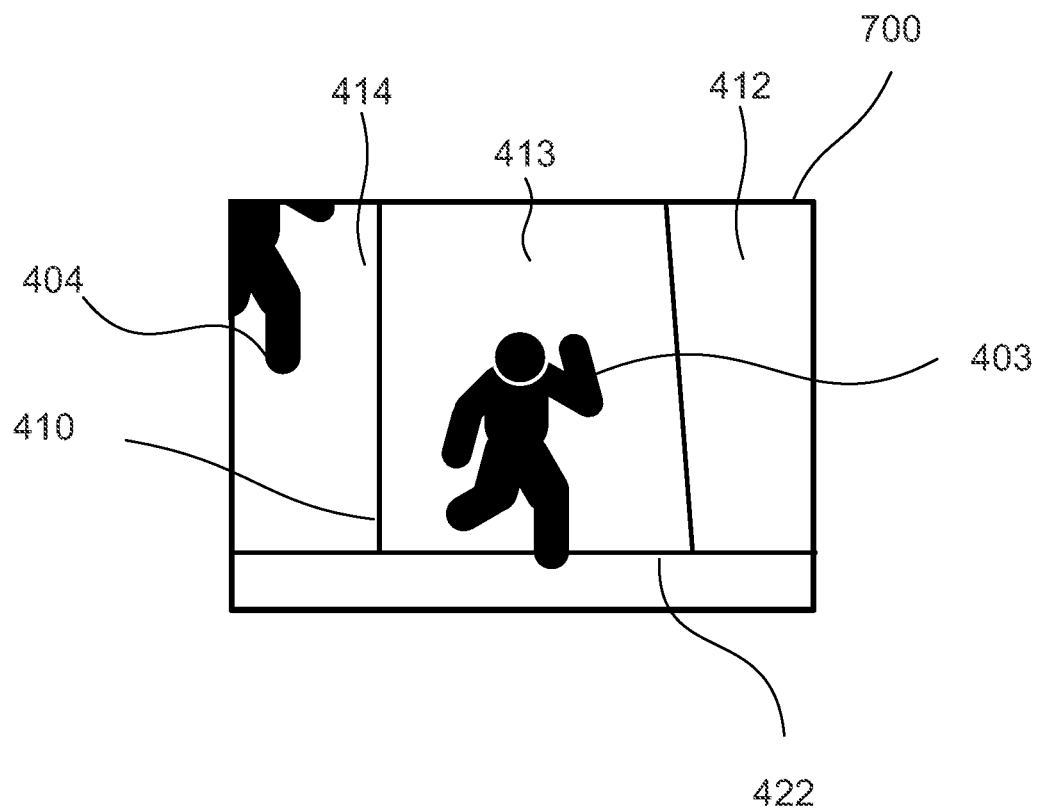
FIG. 7 is an illustration of a framing corresponding to another frame subset in the example of FIG. 5.

FIG. 7 shows a framing 700 that corresponds to the narrow angle field of view 531 in FIG. 5. As described above, the athletic track is divided into six lanes, numbered 1 to 6. Each lane has a single athlete. In the frame subset for the narrow angle field of view 531, only lane two (2) 412, lane three (3) 413, and lane four (4) 414 are visible. The athlete 403 is in lane three (3) 413, and is predicted to be in the position shown in FIG. 7. The athlete 404 is in lane four (4) 414, and is predicted to be in the position shown in FIG. 7. The athletes finish the race at the finishing line 422.

Figure 8:
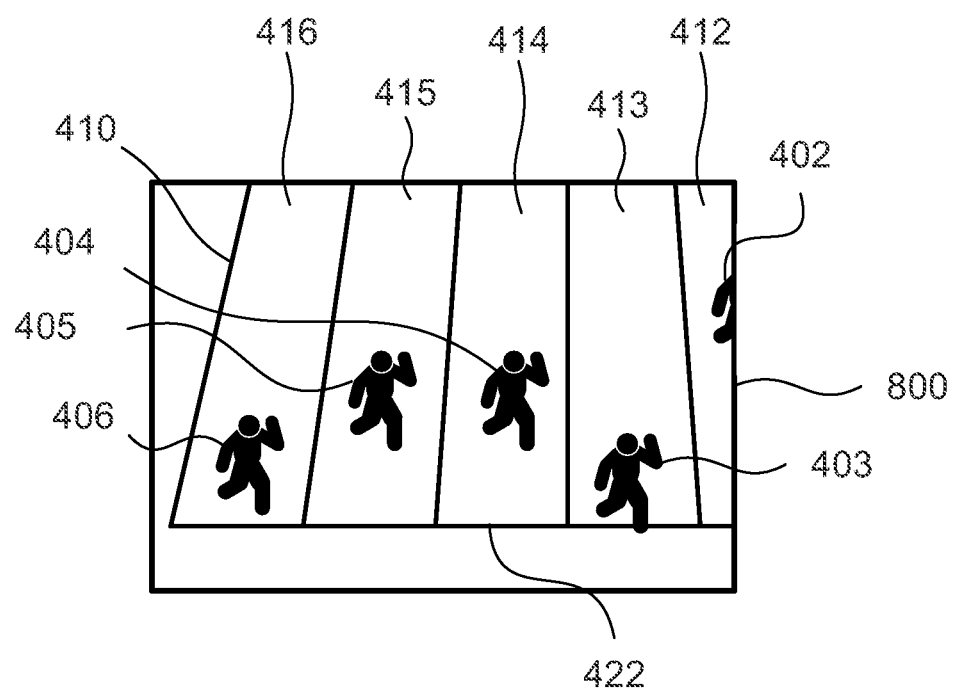
FIG. 8 is an illustration of a framing corresponding to an intermediate field of view in the example of FIG. 5.

FIG. 8 shows framing 800 that corresponds to intermediate field of view 532 in FIG. 5. As described above, the athletic track 410 is divided into six lanes, numbered 1 to 6. Each lane has a single athlete. In the frame subset for the intermediate field of view 532, only lane two (2) 412, lane three (3) 413, lane four (4) 414, lane five (5) 415, and lane six (6) 416 are visible. The athlete 402 is in lane two (2) 412, and is predicted to be in the position shown in FIG. 8, as at step 230 of the method 200. Similarly, the athlete 403 is in lane three (3) 413, and is predicted to be in the position shown in FIG. 8; the athlete 404 is in lane four 0 414, and is predicted to be in the position shown in FIG. 8; the athlete 405 is in lane five (5) 415, and is predicted to be in the position shown in FIG. 8; and the athlete 406 is in lane six (6) 416, and is predicted to be in the position shown in FIG. 8. The athletes finish the race at the finishing line 422.

Figure 9A:
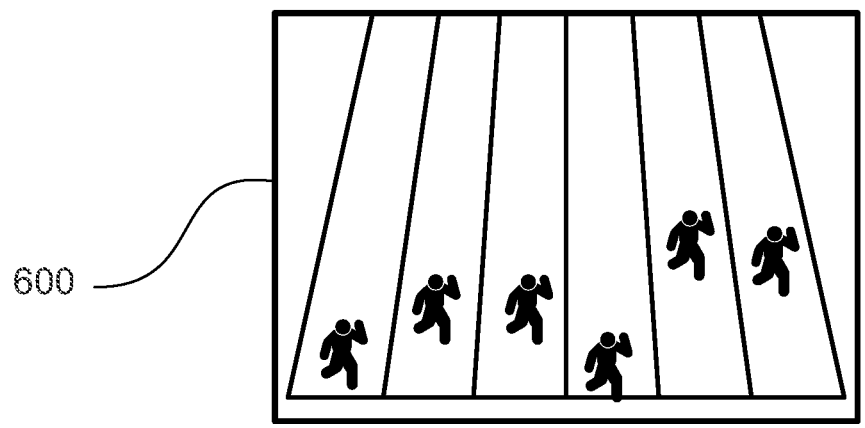
FIG. 9A shows a framing corresponding to the wide angle field of view of FIG. 5.
Figure 9B:
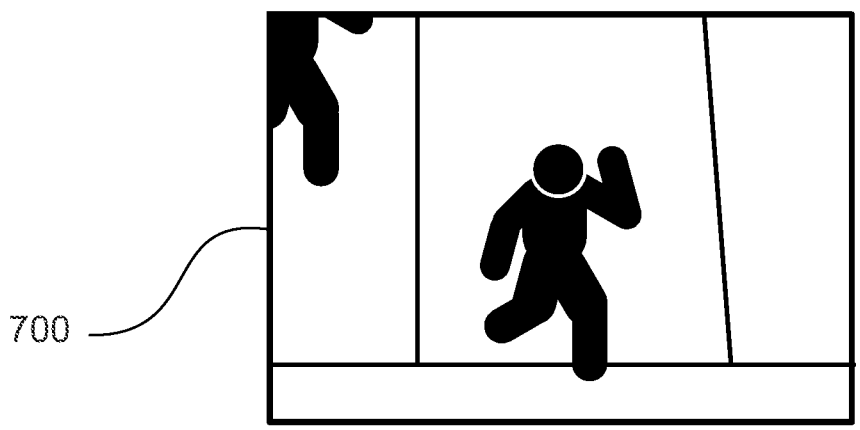
FIG. 9B shows a framing corresponding to the narrow angle field of view of FIG. 5.
Figure 9C:
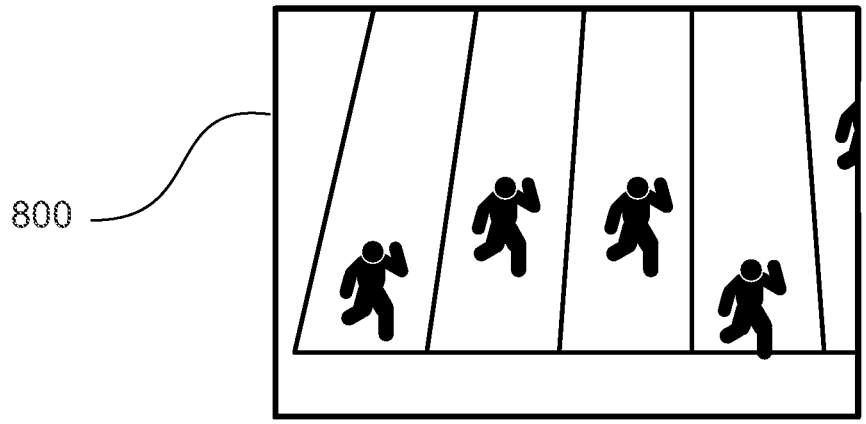
FIG. 9C shows a framing corresponding to the intermediate field of view of FIG. 5.

FIGS. 9A, 9B and 9C show the three framings 600, 700 and 800, respectively, corresponding to three frame subsets of the athletes. Framing 600 corresponds to the wide-angle field of view 530 shown in the example of FIG. 6. Framing 700 corresponds to the narrow angle field of view 531 shown in the example of FIG. 7. Framing 800 corresponds to the intermediate field of view 532 shown in the example of FIG. 8.

Each frame subset is assigned a score as at step 250 of the method 200. The score for each frame subset may be determined as the sum of the following subscores: confidence that the winning athlete is included, predicted narrowness of the field of view of a corresponding framing, and predicted aesthetic quality of the corresponding framing Scores are determined by the scoring module 314 in FIG. 3, under execution of the processor 105, as at step 250 of the method 200 in FIG. 2.

In the example of FIG. 9A, 9B and 9C, the frame subset that corresponds to the framing 600 is assigned subscores of (1.0, 0.0, 0.5), giving a total score of 1.5. The subscores for the frame subset corresponding to the framing 600 are determined because, given the frame subset corresponding to the framing 600, it is highly likely that the actual winning athlete will be included in the framing 600; the framing 600 is wide angle; and the framing 600 is predicted to be of average aesthetic quality.

The frame subset that corresponds to the framing 700, as shown in FIG. 9B, is assigned the subscores of (0.2, 1.0, 0.6), giving a total score of 1.8. The subscores for the frame subset corresponding to the framing 700 are determined because, given the frame subset correpsonding to the framing 700, it is reasonably likely that the winning athlete may not be the athlete in lane three (3); the framing is narrow angle; and the framing is predicted to be of high aesthetic quality.

The frame subset that corresponds to the framing 800 is assigned the subscores of (0.9, 0.5, 0.7) giving a total score of 2.1. The subscores for the frame subset corresponding to the framing 800 are determined because, given the frame subset corresponding to the framing 800, it is highly likely that the winning athlete will be included in the framing 800 since both the predicted winning athlete and the predicted close runner-up are included; the framing 800 is of intermediate field of view 532; and the framing is predicted to be of high aesthetic quality.

The frame subset that corresponds to the framing 800 has the highest score, and is selected (as at step 260 of the method 200). The selection of frame subset is determined by the scoring module 314 in FIG. 3, under execution of the processor 105, as at step 260 of the method 200 in FIG. 2.

The pan/tilt settings corresponding to the framing corresponding to the frame subset 800 are determined (as at step 270 of the method 200). The pan/tilt settings are determined by the pan/tilt control module 317 in FIG. 3, under execution of the processor 105, as at step 270 of the method 200 in FIG. 2.

The zoom setting corresponding to the framing corresponding to the frame subset 800 is determined (as at step 270 of the method 200). The zoom setting is determined by the zoom control module 316 in FIG. 3, under execution of the processor 105, as at step 270 of the method 200 in FIG. 2.

Corresponding to framing 800, the pan/tilt base 186 is controlled to change the orientation of the adjustable zoom camera 185, and the zoom setting of the adjustable zoom camera 185 is set. The control of the pan/tilt base 186 is performed by the pan/tilt control module 317 in FIG. 3, and corresponds to step 280 in FIG. 2. The control of the zoom setting is performed by the zoom control module 316 in FIG. 3, under execution of the processor 105, as at step 280 of the method 200 in FIG. 2.

At the time the winning athlete is predicted to cross the finishing line 422, or just prior, the adjustable zoom camera 185 is controlled to capture one or more images. The control of the shutter of the camera 185 is performed by the shutter control module 315 in FIG. 3, under execution of the processor 105, as at step 290 of the method 200 in FIG. 2. In accordance with the method 200, an automated system may capture a high-quality image of an event, involving multiple moving objects.

Figure 10:
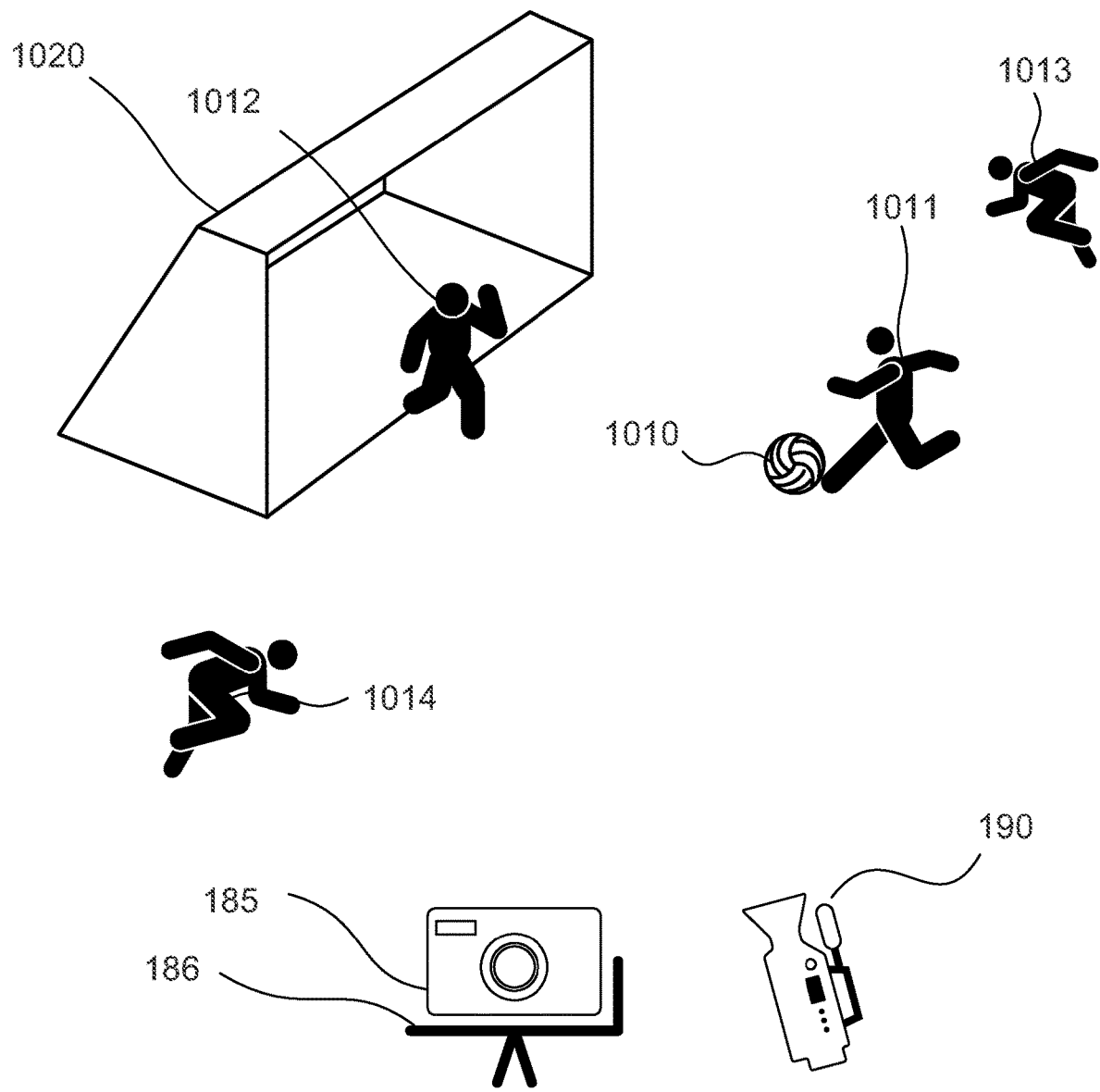
FIG. 10 shows an example of a football match where the method of FIG. 2 may be used.

FIG. 10 shows an example of a football match where the method 200 may be used. As seen in FIG. 10, the adjustable zoom camera 185 is placed upon a motorized pan/tilt base 186, and is used to capture a high quality image of an event. The wide-angle camera 190 is placed on the fixed base, and is used to determine the location of objects (e.g., players in the match of FIG. 10). In the example of FIG. 10, a player 1012, with the role of goalkeeper, defends goalposts 1020. A player 1014, on the same team as the goalkeeper, runs towards ball 1010. A player 1011, on the opposing team to the goalkeeper with the role of striker, prepares to make a shot at goal 1020. A player 1013, on the same team as the striker, runs parallel to the striker. The event to be photographed is either a save by the player with the role of goalkeeper 1012, or the scoring of a goal.

Figure 11:
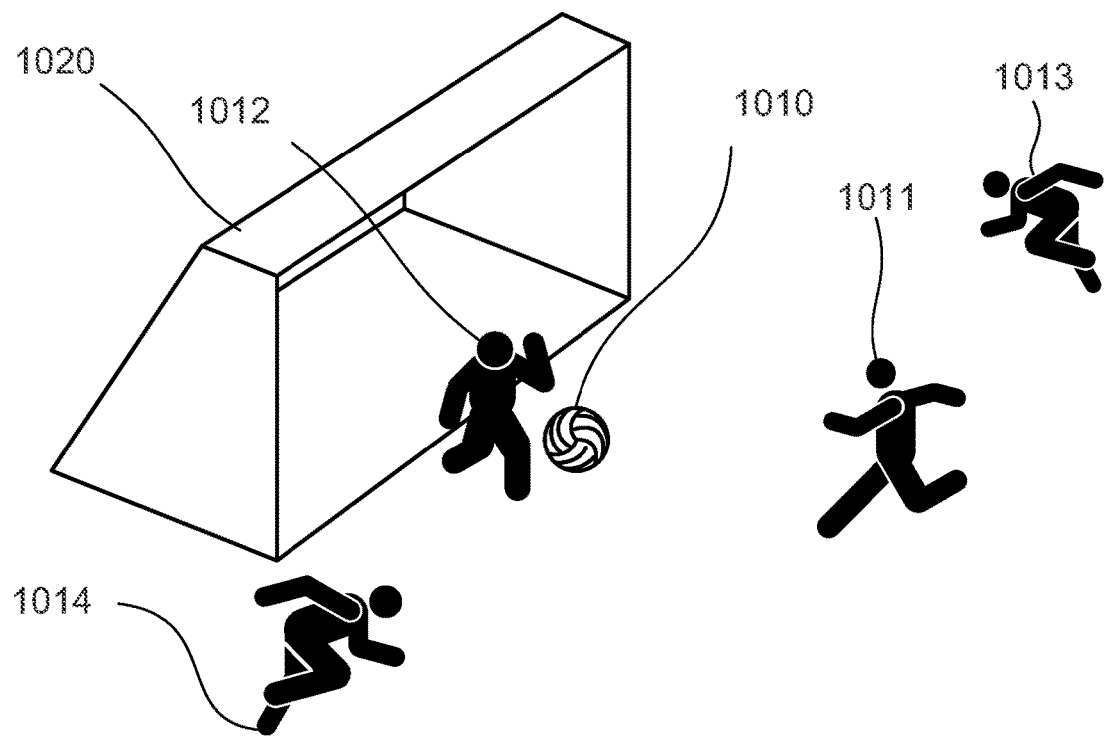
FIG. 11 shows an example of a prediction of an event in the football match of FIG. 10.
Figure 11:
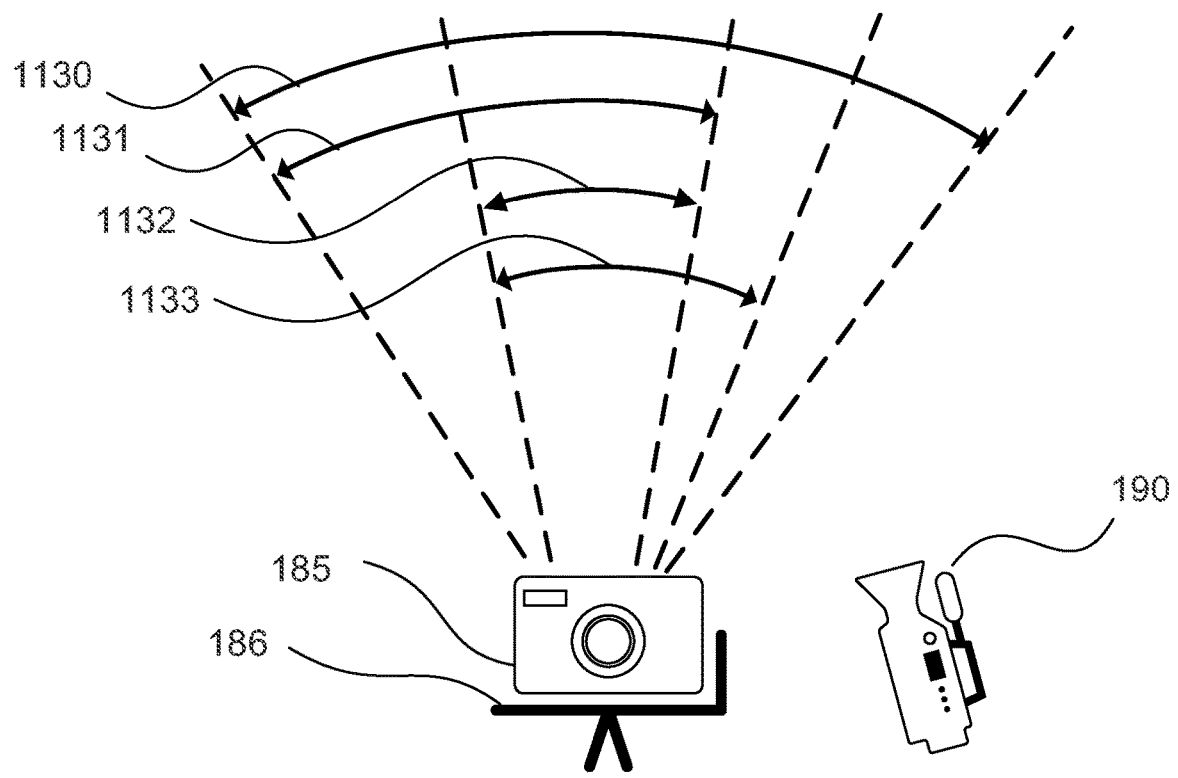

FIG. 11 shows an example of a prediction of an event in the football match that is shown in FIG. 10. The adjustable zoom camera 185 is placed upon a motorized pan/tilt base 186, and is used to capture a high-quality image of an event. The wide-angle camera 190 is placed on a fixed base, and is used to determine the location of objects (e.g., players of the match of FIG. 10). The predicted time of the event, being either the scoring of a goal or the save of goal by the goalkeeper 1012, is determined from the location and motion of the objects. The player 1012, with the role of goalkeeper, is predicted to have moved to the location shown in FIG. 11 compared to the position of the player 1012 in FIG. 10, in order to defend the goalposts 1020. The player 1014, on the same team as the goalkeeper 1012, is predicted to have moved to the location shown in FIG. 11. The player 1011, on the opposing team to the goalkeeper 1012 with the role of striker, is predicted to have moved to the location shown in FIG. 11, having just kicked the ball 1010 towards the goalposts 1020. The ball 1010 is predicted to have moved to the location shown in FIG. 11. A player 1013, on the same team as the striker, is predicted to have moved to the location shown in FIG. 11.

Multiple frame subsets of the players and ball are possible. Frame subsets of the players and ball are determined by the frame subset module 313 in FIG. 3, as at step 240 of the method 200 in FIG. 2.

A possible frame subset of the players and ball includes all players 1011, 1012, 1013, 1014 and the ball 1010, and the corresponding framing is shown by the wide-angle field of view 1130. Another possible frame subset only includes the defending players 1012 and 1014 and the ball 1010, and the corresponding framing is shown by the intermediate field of view 1131. Another possible frame subset includes only the goalkeeper 1012 and the ball 1010, and the corresponding framing is shown by the narrow angle field of view 1132. Another possible frame subset includes the goalkeeper 1012, the striker 1011, and the ball 1010, and the corresponding framing is shown by the intermediate field of view 1133.

Figure 12:
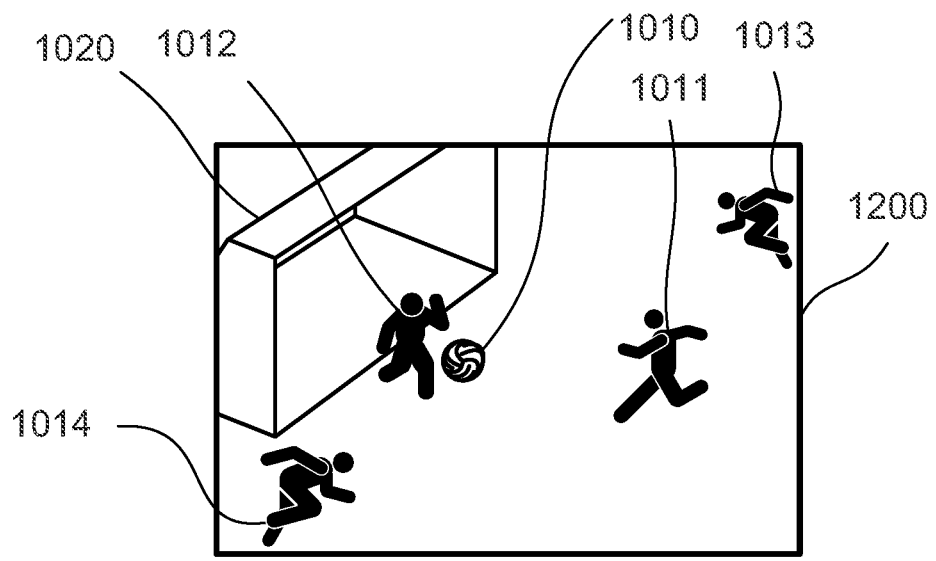
FIG. 12 shows a framing corresponding to a frame subset in the example of FIG. 10.

FIG. 12 shows a framing 1200 that corresponds to the wide-angle field of view 1130 in FIG. 11. In the framing 1200, the player 1012, with the role of goalkeeper, is predicted (as at step 230) to have moved to the location shown in FIG. 12, as at step 230, in order to defend the goalposts 1020. The player 1014, on the same team as the goalkeeper 1012, is predicted (as at step 230) to have moved to the location shown in FIG. 12. The player 1011, with the role of striker, is predicted (as at step 230) to have moved to the location shown in FIG. 12, having just kicked the ball 1010 towards the goalposts 1020. The ball 1010 is predicted to have moved to the location shown in FIG. 12. The player 1013, on the same team as the striker 1011, is predicted (as at step 230) to have moved to the location shown in FIG. 12.

Figure 13:
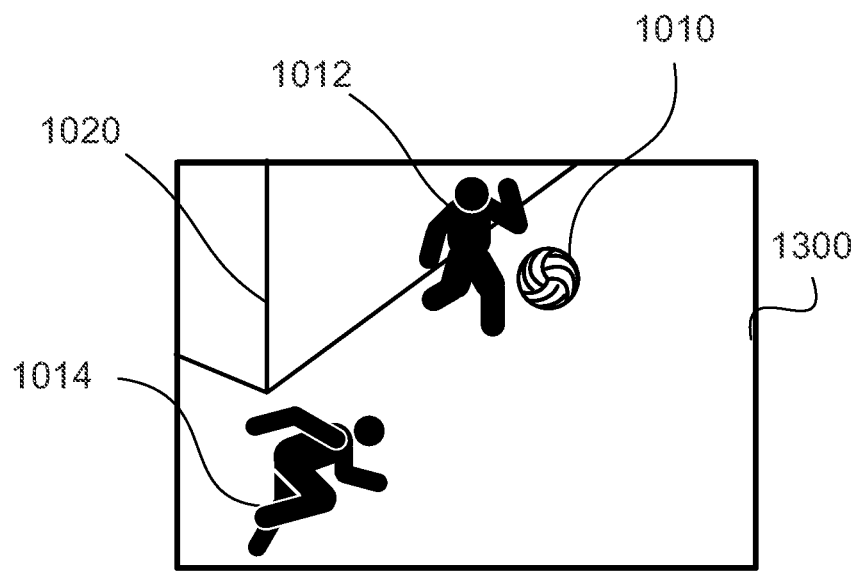
FIG. 13 shows a framing corresponding to another frame subset in the example of FIG. 10.

FIG. 13 shows a framing 1300 that corresponds to the intermediate field of view 1131 in FIG. 11, including the subset of players on the defending team. The player 1012, with the role of goalkeeper, is predicted (as at step 230) to have moved to the location shown in FIG. 13, in order to defend the goalposts 1020. The player 1014, on the same team as the goalkeeper 1012, is predicted (as at step 230) to have moved to the location shown in FIG. 13. The ball 1010 is predicted (as at step 230) to have moved to the location shown in FIG. 13.

Figure 14:
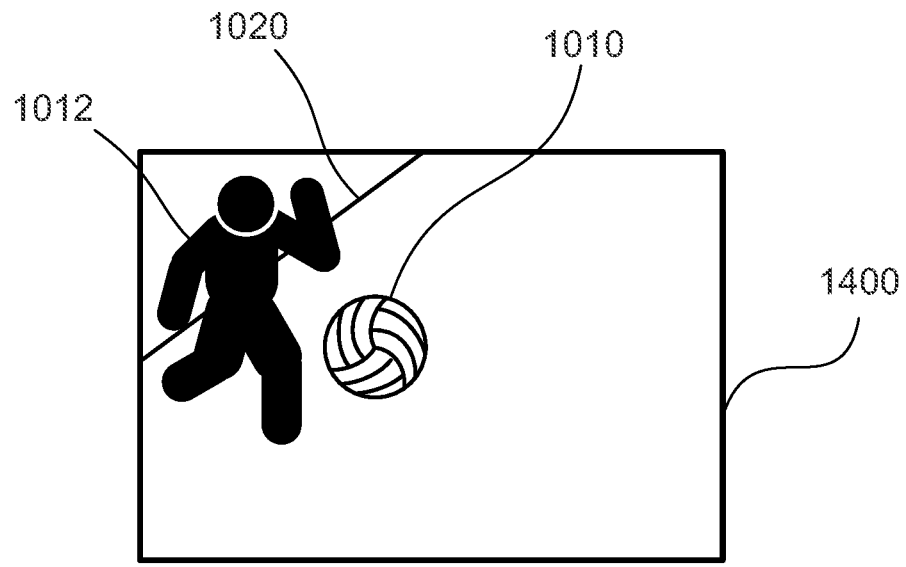
FIG. 14 is an illustration of a framing corresponding to a frame subset.

FIG. 14 shows a framing 1400 that corresponds to narrow angle field of view 1132 in FIG. 11. The player 1012, with the role of goalkeeper, is predicted (as at step 230) to have moved to the location shown in FIG. 14, in order to defend the goalposts 1020. The ball 1010 is predicted (as at step 230) to have moved to the location shown in FIG. 14.

Figure 15:
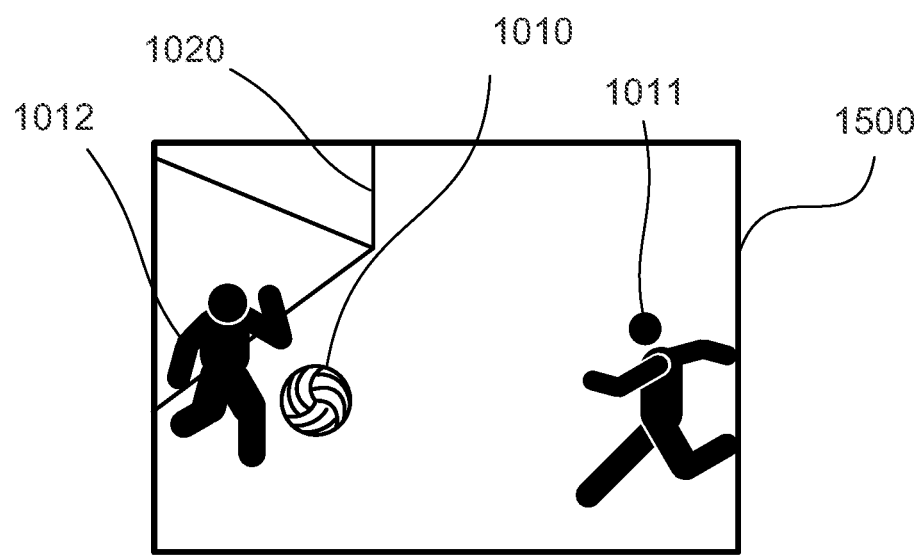
FIG. 15 is an illustration of a framing corresponding to a frame subset.
Figure 16A:
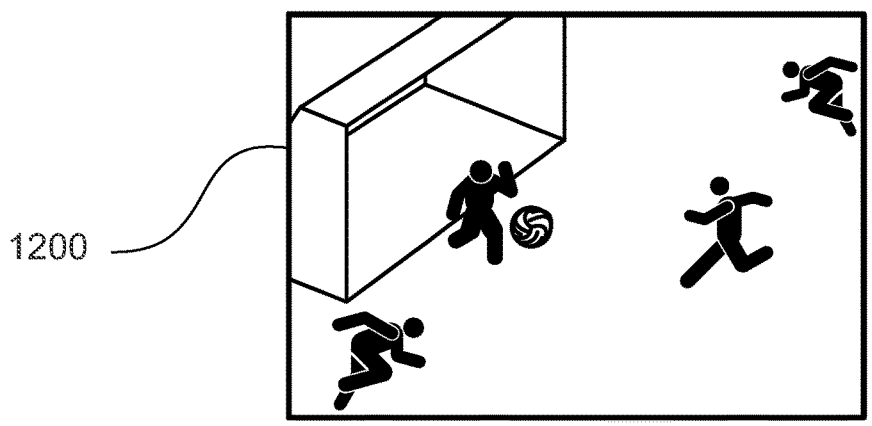
FIG. 16A shows a framing corresponding to the wide-angle field of view of FIG. 11.
Figure 16B:
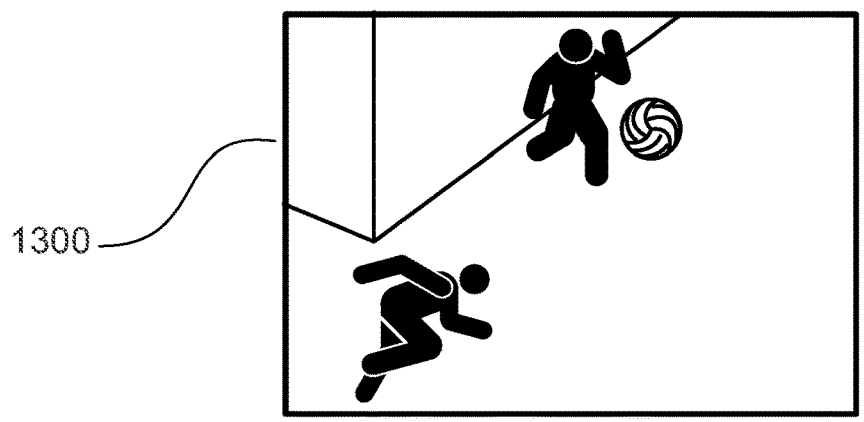
FIG. 16B shows a framing corresponding to the intermediate field of view in FIG. 11.
Figure 16C:
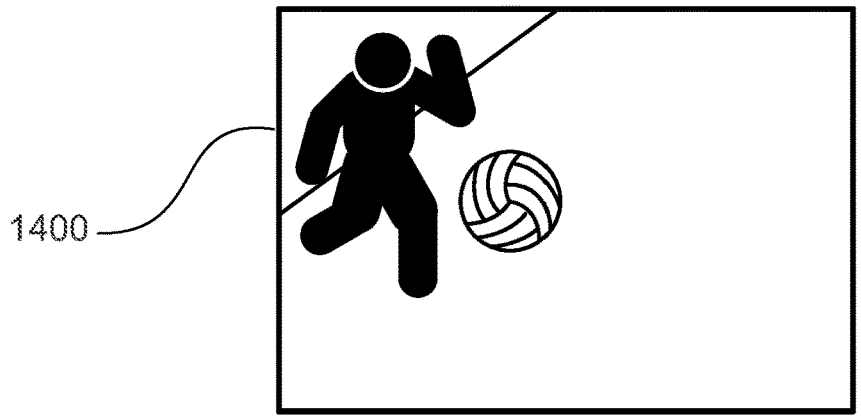
FIG. 16C shows a framing corresponding to the narrow angle field of view in FIG. 11.
Figure 16D:
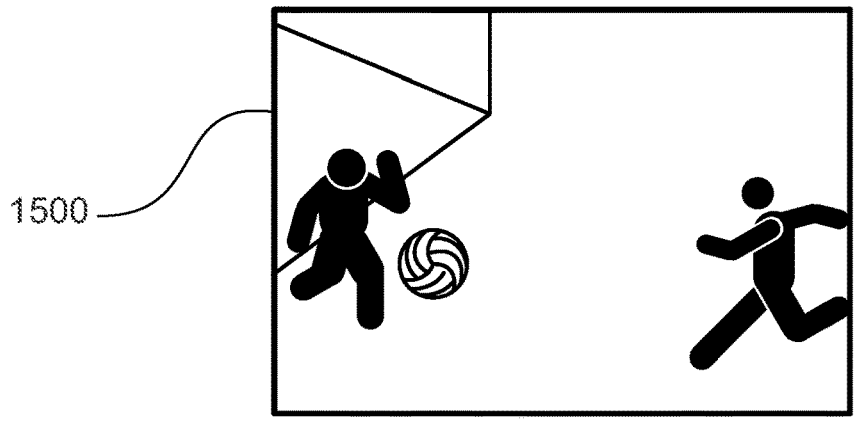
FIG. 16D shows a framing corresponding to the intermediate field of view in FIG. 11.

FIG. 15 shows a framing 1500 that corresponds to intermediate field of view 1133 in FIG. 11. The player 1012, with the role of goalkeeper, is predicted (as at step 230) to have moved to the location shown in FIG. 15, in order to defend the goalposts 1020. The player 1011, with the role of striker, is predicted (as at step 230) to have moved to the location shown in FIG. 15, having just kicked the ball 1010 towards the goalposts 1020. The ball 1010 is predicted (as at step 230) to have moved to the location shown in FIG. 15.

FIGS. 16A, 16B, 16C and 16D show the four framings 1200, 1300, 1400, 1500, respectively, corresponding to four frame subsets of the players and ball. Framing 1200 corresponds to the wide-angle field of view shown in FIG. 12. Framing 1300 corresponds to the intermediate field of view shown in FIG. 13. Framing 1400 corresponds to the narrow angle field of view shown in FIG. 14. Framing 1500 corresponds to the intermediate field of view shown in FIG. 15. Each frame subset is assigned a score (as at step 250 of the method 200), which may be determined as the sum of the following subscores: predicted narrowness of the field of view of the corresponding framing, and predicted aesthetic quality of the corresponding framing Scores are determined by the scoring module 314 in FIG. 3, as at step 250 of the method 200 in FIG. 2.

In the example of FIGS. 16A to 16D, the frame subset corresponding to the framing 1200 is assigned the subscores of (0.5, 0.5), giving a total score of 1.0. The subscores are determined for the frame subset corresponding to the framing 1200 because, given the frame subset corresponding to the framing 1200, the framing is wide angle; and the framing 1200 is predicted to be of average aesthetic quality due to the presence of four players.

The frame subset corresponding to the framing 1300 is assigned the subscores of (0.7, 0.2), giving a total score of 0.9. The subscores are determined because, given this frame subset, the framing is of intermediate field of view; and the framing is predicted to be of low aesthetic quality due to the presence of only two defenders.

The frame subset corresponding to the framing 1400 is assigned the subscores of (1.0, 0.4) giving a total score of 1.4. The subscores are determined for the frame subset corresponding to the framing 1400 because, given the frame subset corresponding to the framing 1400, the framing is narrow angle; and the framing 1400 is predicted to be of average aesthetic quality due to the presence of only one player.

The frame subset corresponding to the framing 1500 is assigned the subscores of (0.7, 0.8) giving a total score of 1.5. The subscores are determined for the frame subset corresponding to the framing 1500 because, given the frame subset corresponding to the framing 1500, the framing is of intermediate field of view; and the framing 1500 is predicted to be of high aesthetic quality due to the presence of both the striker and the goalkeeper.

The frame subset corresponding to the framing 1500 has the highest score, and is selected (as at step 260 of the method 200). The selection of frame subset is determined by the scoring module 314 in FIG. 3, under execution of the processor 105, as at step 260 of the method 200 in FIG. 2.

The pan/tilt settings corresponding to the framing 1500 are determined (as at step 270 of the method 200). The pan/tilt settings are determined by the pan/tilt control module 317 in FIG. 3, under execution of the processor 105, as at step 270 of the method 200 in FIG. 2.

The zoom setting corresponding to the framing 1500 is determined (as at step 270 of the method 200). The zoom setting is determined by the zoom control module 316 in FIG. 3, and corresponds to step 270 in FIG. 2.

Corresponding to the framing 1500, the pan/tilt base 186 is controlled to change the orientation of the adjustable zoom camera 185, and the zoom setting of the adjustable zoom camera 185 is set. The control of the pan/tilt base 186 is performed by the pan/tilt control module 317 in FIG. 3, under execution of the processor 105, and corresponds to step 280 in FIG. 2. The control of the zoom setting is performed by the zoom control module 316 in FIG. 3, under execution of the processor 105, and corresponds to step 280 in FIG. 2.

At the time the ball 1010 is predicted to reach the player 1012 with the role of goalkeeper, or just prior, the adjustable zoom camera 185 is controlled to capture one or more images. The control of the shutter of the camera 185 is performed by the shutter control module 315 in FIG. 3, under execution of the processor 105, and corresponds to step 290 in FIG. 2.

As described above, the method 200 may be used to capture a high-quality photograph of an event, involving multiple moving objects.

INDUSTRIAL APPLICABILITY

The arrangements described are applicable to the computer and data processing industries and particularly for image processing.

The foregoing describes only some embodiments of the present invention, and modifications and/or changes can be made thereto without departing from the scope and spirit of the invention, the embodiments being illustrative and not restrictive.

The invention claimed is:

1. A method of capturing an image of a scene, the method comprising:
   determining a current location of a plurality of objects in a frame of a video capturing the scene having one or more events of interest;
   predicting, for at least one of the events of interest, a time and a location for each of the plurality of objects associated with the at least one of the events of interest based on the current location of the plurality of objects;
   determining a frame subset score for each of a plurality of frame subsets in the frame, each of the plurality of frame subsets predicted to include one or more of the plurality of objects based on the predicted time and the predicted location for the event of interest;
   selecting one of the determined plurality of frame subsets based on the determined frame subset score;
   in accordance with a camera orientation setting that is set for capturing the selected frame subset and is related to a capturing direction of a camera and/or an angle field of view of the camera, changing the capturing direction of the camera and/or the angle field of view of the camera; and
   capturing an image of the event of interest using the camera, without receiving any instruction from a user regarding the camera orientation and/or the angle field of view of the camera, the image being captured based on the capturing direction of the camera changed in accordance with the camera orientation setting and/or the angle field of view of the camera changed in accordance with the camera orientation setting, wherein the captured image comprises the selected frame subset.

2. The method according to claim 1, wherein one or more of the objects are people associated with the event.

3. The method according to claim 1, wherein the camera orientation setting comprises a value each for pan, tilt and zoom.

4. The method according to claim 1, wherein each camera orientation setting is further based on a content value associated with one or more persons within the corresponding frame subset.

5. The method according to claim 4, wherein the content value of a frame subset is based on size of persons within the frame subset.

6. The method according to claim 4, wherein the content value of a frame subset is further based on an interaction score between the objects within the frame subset.

7. The method according to claim 4, wherein the content value may be based on narrowness of field of view.

8. The method according to claim 4, wherein the content value may be based on confidence that selected frame subset will be adequate to capture the event.

9. The method according to claim 1, wherein the video is captured by another camera that is not identical to the camera.

10. The method according to claim 1, wherein, in the predicting, the time and the location for each of the plurality of objects are predicted before occurrence of the at least one of the events of interest.

11. An apparatus for capturing an image of a scene, the apparatus comprising:

a memory for storing data and a computer program;

a processor coupled to the memory for executing the computer program, the program comprising instructions for:

determining a current location of a plurality of objects in a frame of a video capturing the scene having one or more events of interest;

predicting, for at least one of the events of interest, a time and a location for each of the plurality of objects associated with the at least one of the events of interest based on the current location of the plurality of objects;

determining a frame subset score for each of a plurality of frame subsets in the frame, each of the plurality of frame subsets predicted to include one or more of the plurality of objects based on the predicted time and the predicted location for the event of interest;

selecting one of the determined plurality of frame subsets based on the determined frame subset score, wherein in accordance with a camera orientation setting that is set for capturing the selected frame subset and is related to a capturing direction of a camera and/or an angle field of view of the camera, the capturing direction of the camera and/or the angle field of view of the camera is changed; and capturing an image of the event of interest using the camera, without receiving any instruction from a user regarding the camera orientation and/or the angle field of view of the camera, the image being captured based on the capturing direction of the camera changed in accordance with the camera orientation setting and/or the angle field of view of the camera changed in accordance with the camera orientation setting, wherein the captured image comprises the selected frame subset.

12. A system for capturing an image of a scene, the system comprising:

a memory for storing data and a computer program;

a processor coupled to the memory for executing the computer program, the program comprising instructions for:

determining a current location of a plurality of objects in a frame of a video capturing a scene having one or more events of interest;

predicting, for at least one of the events of interest, a time and a location for each of the plurality of objects associated with the at least one of events of interest based on the current location of the plurality of objects;

determining a frame subset score for each of a plurality of frame subsets in the frame, each of the plurality of frame subsets predicted to include one or more of the plurality of objects based on the predicted time and the predicted location for the event of interest;

selecting one of the determined plurality of frame subsets based on the determined frame subset score;

in accordance with a camera orientation setting that is set for capturing the selected frame subset and is related to a capturing direction of a camera and/or an angle field of view of the camera, changing the capturing direction of the camera and/or the angle field of view of the camera; and capturing an image of the event of interest using the camera, without receiving any instruction from a user regarding the camera orientation and/or the angle field of view of the camera, the image being captured based on the capturing direction of the camera changed in accordance with the camera orientation setting and/or the angle field of view of the camera changed in accordance with the camera orientation setting, wherein the captured image comprises the selected frame subset.

13. A non-transitory computer readable medium having a computer program stored on the medium for capturing an image of a scene, the program comprising:

code for determining a current location of a plurality of objects in a frame of a video capturing a scene having one or more events of interest;

code for predicting, for at least one of the events of interest, a time and a location for each of the plurality of objects associated with the at least one of the events of interest based on the current location of the plurality of objects;

code for determining a frame subset score for each of a plurality of frame subsets in the frame, each of the plurality of frame subsets predicted to include one or more of the plurality of objects based on the predicted time and the predicted location for the event of interest;

code for selecting one of the determined plurality of frame subsets based on the determined frame subset score, wherein in accordance with a camera orientation setting that is set for capturing the selected frame subset and is related to a capturing direction of a camera and/or an angle field of view of the camera, the capturing direction of the camera and/or the angle field of view of the camera is changed; and code for capturing an image of the event of interest using the camera, without receiving any instruction from a user regarding the camera orientation and/or the angle field of view of the camera, the image being captured based on the capturing direction of the camera changed in accordance with the camera orientation setting and/or the angle field of view of the camera changed in accordance with the camera orientation setting, wherein the captured image comprises the selected frame subset.

* * * * *